(12) United States Patent
Doerr

(10) Patent No.: US 10,089,262 B2
(45) Date of Patent: Oct. 2, 2018

(54) REDUCED OVERHEAD SAFEPOINT MECHANISM USING SIGNALS

(71) Applicant: SAP SE, Walldorf (DE)

(72) Inventor: Martin Doerr, Schwaigern (DE)

(73) Assignee: SAP SE, Walldorf (DE)

( * ) Notice: Subject to any disclaimer, the term of this patent is extended or adjusted under 35 U.S.C. 154(b) by 199 days.

(21) Appl. No.: 14/744,318

(22) Filed: Jun. 19, 2015

(65) Prior Publication Data

US 2016/0371207 A1    Dec. 22, 2016

(51) Int. Cl.
  *G06F 13/24*    (2006.01)
(52) U.S. Cl.
  CPC .................................... *G06F 13/24* (2013.01)
(58) Field of Classification Search
  None
  See application file for complete search history.

(56) References Cited

U.S. PATENT DOCUMENTS

| | | | | |
|---|---|---|---|---|
| 6,594,752 B1 * | 7/2003 | Baxter | ..................... | G06F 8/447 712/227 |
| 8,544,020 B1 * | 9/2013 | Tene | ..................... | G06F 9/3001 718/108 |
| 9,116,742 B1 * | 8/2015 | Schuttenberg | ......... | G06F 9/4812 |
| 9,361,114 B1 * | 6/2016 | Tene | ..................... | G06F 9/3861 |
| 2004/0111718 A1 * | 6/2004 | Detlefs | ............... | G06F 12/0269 717/151 |
| 2007/0061791 A1 * | 3/2007 | Hartikainen | ............ | G06F 9/461 717/148 |
| 2016/0210069 A1 * | 7/2016 | Lutas | ..................... | G06F 3/0622 |
| 2016/0328310 A1 * | 11/2016 | Bhandari | .................. | G06F 8/67 |
| 2017/0010879 A1 * | 1/2017 | Ashank | ..................... | G06F 8/67 |

* cited by examiner

*Primary Examiner* — Henry Tsai
*Assistant Examiner* — Aurangzeb Hassan
(74) *Attorney, Agent, or Firm* — Schwegman Lundberg & Woessner, P.A.

(57) ABSTRACT

A system and method for searching for and finding data across industrial time-series data is disclosed executing a series of instructions on a computer system. While executing a first instruction in the series of instructions, the virtual machine receives an interrupt signal. In response to receiving the interrupt signal, the virtual machine searches the series of instructions to identify a second instruction that is a safe point. The virtual machine replaces the second instruction in the series of instructions with one or more interrupt handler instructions that initiate an interrupt handler. The virtual machine resumes execution of the first instruction.

20 Claims, 17 Drawing Sheets

REDUCED OVERHEAD SAFEPOINT MECHANISM USING SIGNALS

TECHNICAL FIELD

The disclosed example embodiments relate generally to the field of virtual machines and, in particular, to interrupt handling.

BACKGROUND

The rise of the computer age has resulted in increased access to personalized services through computer networks. As the cost of electronics and networks drop, many services that were previously provided in person are now provided remotely over the Internet. For example, entertainment has increasingly shifted to the online space with companies streaming television (TV) shows and movies to members at home. Similarly, electronic mail (e-mail) has reduced the need for letters to be physically delivered. Instead, messages can be sent over networked systems almost instantly. Online social networking sites allow members to build and maintain personal and business relationships in a much more comprehensive and manageable manner.

One way that services can be increasingly useful is through the use of virtual machines that can convert generic instructions in real time to run on a variety of different electronic devices. In this way, programmers can write instructions once for the virtual machine, and the conversion to machine-specific instructions takes place automatically, thus improving efficiency.

Virtual machines need to handle interruptions on a computer device. Traditionally, this occurs by automatically inserting a series of break points into the instructions. When a break point is reached, the virtual machine executes instructions to determine whether an interrupt request has been received. However, the result of these methods is either too frequent checking for interruption of a series of instructions (if the break points are placed frequently into the instructions) or a long response time to interruption requests (if the break points are placed too infrequently into the code).

DESCRIPTION OF THE DRAWINGS

Some example embodiments are illustrated by way of example and not limitation in the Figures of the accompanying drawings, in which.

Like reference numerals refer to the same or similar parts throughout the drawings.

DETAILED DESCRIPTION

Figure 1:
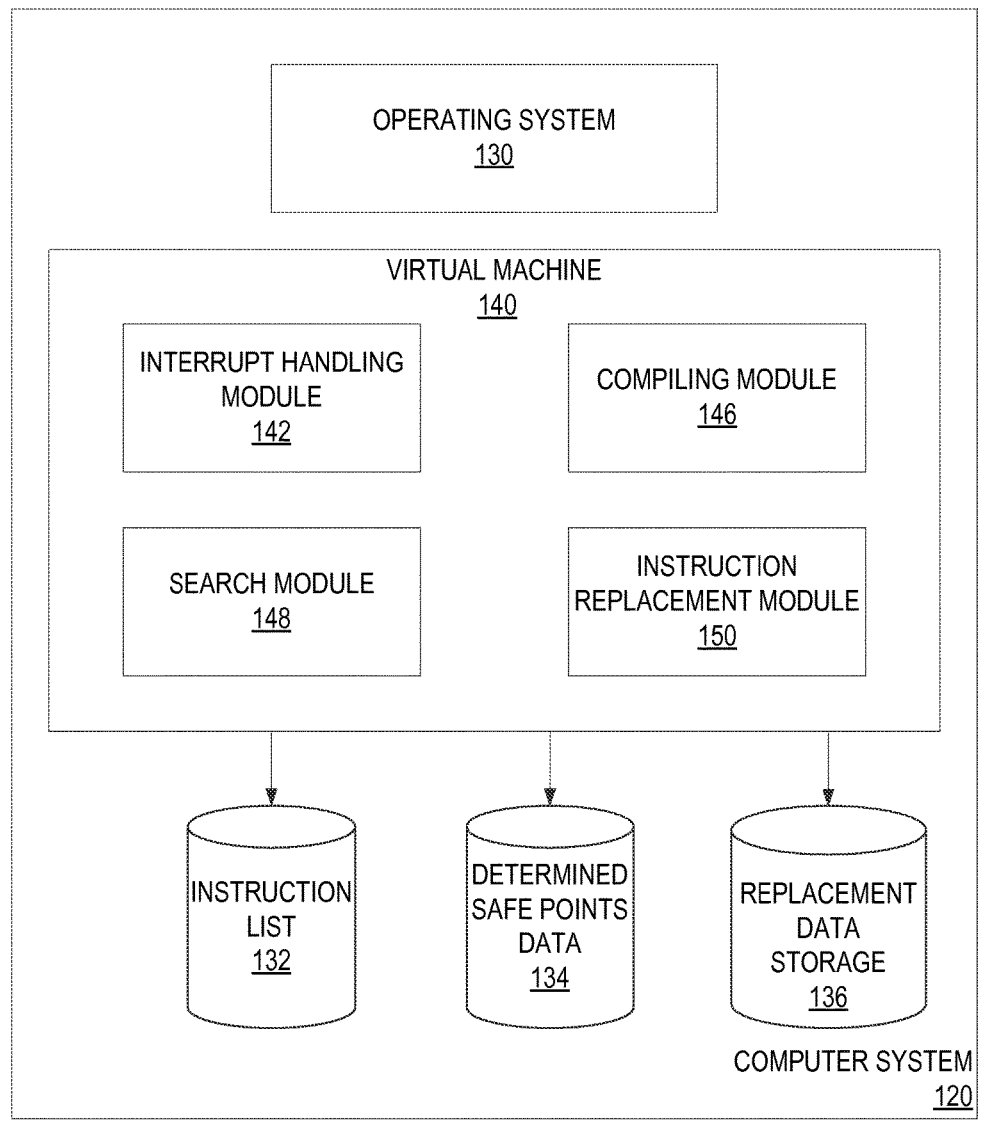
FIG. 1 is a block diagram depicting a computer system, in accordance with an example embodiment, that includes various functional components.

The present disclosure describes methods, systems, and non-transitory computer-readable storage mediums storing computer program products for reducing the overhead computing costs associated with interrupt signals by using code replacement. In the following description, for purposes of explanation, numerous specific details are set forth to provide a thorough understanding of the various aspects of different example embodiments. It will be evident, however, to one skilled in the art, that any particular example embodiment may be practiced without all of the specific details and/or with variations, permutations, and combinations of the various features and elements described herein.

Existing solutions for handling interruptions while executing instructions through a virtual machine either result in an unacceptable level of latency or an undesirable decrease in efficiency for the instruction execution.

A computer device compile a series of instructions (e.g., a program or process) to prepare those instructions to be executed on a processor. This compiling can be done entirely or partially before the instructions are to be executed. The compiling process can also be performed just-in-time, such that the instructions are compiled (compiling includes converting high-level programming code into machine-executable instructions) only as needed by the virtual machine. Regardless of when the compiling occurs, the compiler identifies one or more instructions as safe points. A safe point is an instruction that is a suitable place for a program to be interrupted. For example, a compiler determines that all branch, call, and return instructions are safe points. The compiler can store a list of safe points that includes one or more instructions determined to be safe points.

In some example embodiments, the virtual machine executes instructions in several threads which may get executed on different processors simultaneously. One of the virtual machine's threads may need to interrupt one or more other threads. Therefore, the virtual machine uses an Operating System application programming interface to send them an interrupt signal. In this way, the virtual machine uses the interrupt capability of the operating system to perform specific tasks which requires interaction between different threads being executed by the virtual machine.

In some example embodiments, a virtual machine begins executing a series of instructions for which a list of safe points have been determined. During execution of a first instruction, the virtual machine receives an interrupt request. In response, the virtual machine temporarily halts execution of the current series of instructions.

In response to receiving the interrupt request, and while the execution of the current list of instructions is temporarily halted, the virtual machine searches through the list of instructions (e.g., the instructions that have not yet been executed). For each instruction considered, the virtual machine determines whether the instruction is in the list of eligible safe points. In some example embodiments, the virtual machine determines, based on the instruction itself (e.g., without checking the list of eligible safe points) that the instruction is not an eligible safe point. The virtual machine compares the candidate instruction against the list of eligible safe points. In accordance with a determination that the candidate instruction is not in the list, the virtual machine continues stepping through the instructions.

In accordance with a determination that the candidate instruction is in the list of eligible safe points, the virtual machine identifies the candidate instruction as the target instruction. The list of instructions includes one or more instructions that are conditional or otherwise lead to more than one possible outcome. Each outcome has a different set of instructions. In this case, the virtual machine selects more than one target instruction to ensure that each possible instruction path includes a target instruction.

Once the target instruction has been identified the virtual machine replaces the target instruction(s) with one or more instructions (e.g., a trap instruction) that result in an interrupt handler being run (e.g., that responds to the received interrupt request). The virtual machine stores location information (e.g., in memory, for example) indicating where the target instruction was located before it was replace (e.g., selected candidate instructions) as well as the content of the instructions (e.g., what the replaced instruction(s) were).

Once the one or more instructions have been inserted in the list of instructions in place of the target instructions, the virtual machine then resumes execution of the first instruction (e.g., where the series of instruction was interrupted initially). The virtual machine continues to execute the series of instructions until it encounters one of the inserted instructions. Once the inserted instructions are encountered, the virtual machine automatically executes (e.g., because the insert instructions are interpreted normally and executed) the inserted instructions that cause the interrupt handler to execute.

In some example embodiments, after the interrupt handler has been executed, the virtual machine uses the stored records to replace the one or more instructions that caused the interrupt hander to execute with the original target instructions that were replaced earlier. The virtual machine then resumes execution of the plurality of instructions at the point where the instruction was replaced.

FIG. 1 is a block diagram depicting a computer system 120, in accordance with some example embodiments. The computer system 120 includes an operating system 130, a virtual machine 140, instruction list data 132, determined safe points data 134, and replacement data storage 136. In some example embodiments, the computer system 120 also is connected to one or more third party systems (not shown) through a communication network (also not shown). The communication network may be any of a variety of network types, including local area networks (LANs), wide area networks (WANs), wireless networks, wired networks, the Internet, personal area networks (PANs), or a combination of such networks.

As shown by way of example in FIG. 1, the computer system 120 includes an operating system 130, a virtual machine 140, and one or more data storage devices (e.g., instruction list data 132, replacement data storage 136, and so on). The virtual machine 140 is an application (e.g., a module) running on the computer system 120 that mimics the operation of an independent machine. The virtual machine 140 receives instructions that are written specifically for the virtual machine 140 and then converted to computer instructions that are able to run on the computer system 120. In this way, a program (e.g., a series of instructions) can be written once for a general virtual machine 140. The virtual machine 140 can then be configured to run on a variety of different computer systems and automatically convert the general computer instructions into computer instructions specific to that computer system. In this way, programs can be more efficient (e.g., only write the general code and the virtual machine handles converting it to different platforms).

In the depicted example, the virtual machine 140 includes at least an interrupt handling module 142, a compiling module 146, a search module 148, and an instruction replacement module 150. In some example embodiments, the virtual machine 140 accesses data stored in the instruction list data 132 and replacement data storage 136.

In some example embodiments, the interrupt handling module 142 is a module that receives an interrupt signal. The interrupt signal is generated internally by the virtual machine 140. Internally generated interrupts are related to the instructions which have initiated them and can be handled differently than externally generated interrupt signals.

When an interrupt is generated outside the virtual machine 140, the operating system 130 (or other appropriate module) sends an interrupt signal to the interrupt handling module 142. In response to receiving an interrupt signal at the interrupt handling module 142, the interrupt handling module 142 may perform an action after the execution of a series of instructions is halted.

For example, the virtual machine 140 is executing a series of instructions, one instruction at a time. The Operating System causes execution of a first instruction (e.g., the currently executing instruction) to halt execution and transfers control to the interrupt handling module 142.

The compiling module 146 may perform a just-in-time compiling operation, such that individual instructions or groups of instructions are not compiled until near the time in which they are needed. In some example embodiments, the compiling module 146 also determines, for each complied instruction, whether that instruction is an appropriate break point. In some example embodiments, the compiling module 146 generates instruction list data 132, including a plurality of instructions determined to be appropriate break points (also known as safe points). In some example embodiments, the instruction list data 132 is generated externally to the virtual machine 140 and is received from the same source as the list of instructions (e.g., the computer program) to which they are associated.

In response to the interrupt handling module 142 receiving an interrupt message and halting execution of the plurality of instructions at the first instruction, the virtual machine 140 may cause the search module 148 to search the instruction list data 132 to identify an appropriate safe point instruction.

The search module 148, in an example embodiment, begins searching at the current instruction (e.g., the instruction on which execution of the one or more instructions is halted.) For example, the search module 148 may identify the next instruction to be executed (e.g., based on the instruction list data 132). In some example embodiments, determining the next instruction includes determining which of two potential instructions will be executed next (e.g., when the instruction list data 132 includes a condition that must be evaluated or predicted). The search module 148 will search both potential next instructions such that two (or more) different potential instruction paths are considered.

The search module 148 may consider each instruction to determine whether the instruction is saved in the determined safe points data 134. The determined safe points data 134 can include a list of instructions that have previously been determined to be an appropriate place in a series of instructions (e.g., a program) to halt the series of instructions and handle a received interrupt. For example, the search module 148 identifies instruction F as a possible instruction to be executed in the future. The search module 148 then compares instruction F against the list of determined safe points in the determined safe points data 134. If instruction F is listed in the determined safe points data 134, the search module 148 identifies instruction F as the first identified safe point. If instruction F is not found in the determined safe points data 134, the search module 148 moves to the next instruction to be executed and performs the same lookup procedure again.

If the search module 148 identifies more than one potential sequence of instructions, the search algorithm identifies one safe point for each potential series of instructions. In this way, the virtual machine 140 guarantees that an appropriate safe point will be reached, regardless of which of the plurality of potential instruction sequences ultimately occurs.

In some example embodiments, once the search module 148 identifies one (or several) safe points, the virtual machine 140 uses the instruction replacement module 150 to replace the identified safe point instructions with one or more instructions that allow an interrupt handler associated with the received interrupt request to be run. For example, if the interrupt request is generated based on the need to perform memory management at the virtual machine 140, the interrupt handler will be one that can perform the appropriate memory management functions.

The instruction replacement module 150 stores data about instructions that have been replaced in the replacement data storage 136. In some example embodiments, whenever an instruction is replaced, the instruction replacement module 150 stores the replaced instruction, the location in memory that it was located in, and any other context needed to return the series of instructions to the same state it was before the replacement took place. The replacement data storage 136 stores data for a plurality of replaced instructions (e.g., when more than one series of instructions is possible).

Before or after the interrupt handling module 142 has finished whatever functions were requested by the interrupt request, the instruction replacement module 150 uses the data in the replacement data storage 136 to reinsert the replaced instructions to their original location. For example, instruction H is identified as an appropriate safe point and the instruction replacement module 150 replaces instruction H with a trap instruction that will cause an interrupt handler to execute. Once the interrupt handler is complete, the instruction replacement module 150 replaces the trap instruction with original instruction H.

The computer system 120 includes instruction list data 132. In some example embodiments, the instruction list data 132 is a series of computer instructions intended to be executed on the computer system 120 after being converted by the virtual machine 140. The virtual machine 140 executes the instructions stored in the instruction list data 132 in an order wherein the outcome of an instruction may result in a change in the remaining instruction sequence. For example, an instruction can include a conditional evaluation, such that if the conditional resolves as true, instruction set A will be executed, and if the conditional resolves as false, instruction set B will be executed.

In some example embodiments, the computer system 120 includes determined safe points data 134. The determined safe points data 134 include a plurality of instructions that have been determined previously (e.g., during the compiling step) to meet the qualifications for being a good safe point (e.g., an instruction where the state of the virtual machine 140 is such that interruption will allow the desired task to be performed without negatively affecting the state of one or more programs currently in execution through the virtual machine 140). The identification may be done by the virtual machine 140 through the compiling module 146 as it performs just-in-time compiling. In other example embodiments, the series of determined safe points is determined outside of the virtual machine 140 (e.g., part of pre-processing).

In the depicted example, the computer system 120 includes replacement data storage 136. In some example embodiments, the replacement data storage 136 includes data needed to store information about instructions that have temporarily been removed from the instruction list data 132 when an interrupt is received. The replacement data storage 136, including the instruction, is placed in the instruction list data 132 (e.g., in memory), along with any other information to restore the state of the virtual machine 140 to the exact same position as it had before the interrupt was received.

Figure 2:
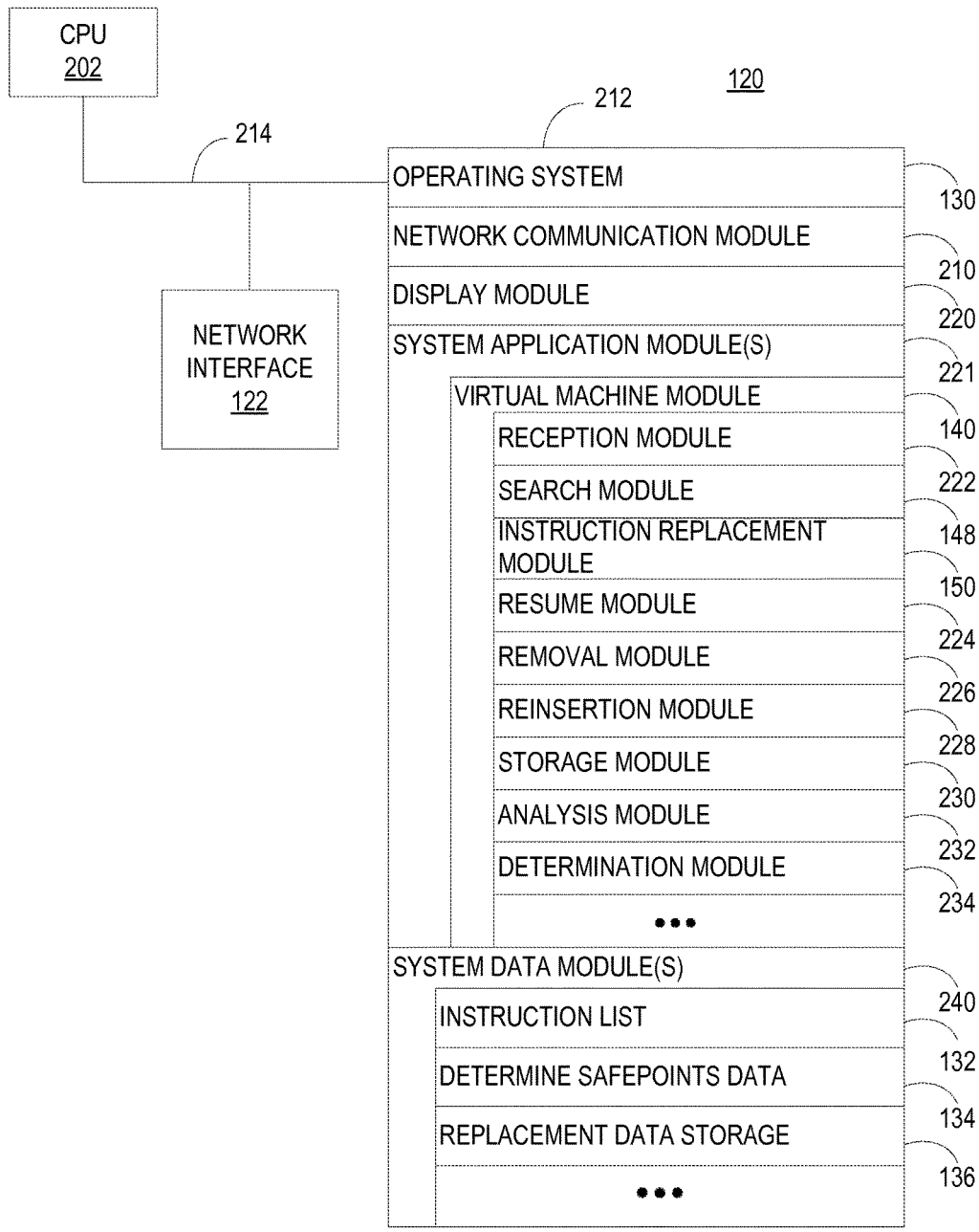
FIG. 2 is a block diagram illustrating a computer system, in accordance with some example embodiments.

FIG. 2 is a block diagram further illustrating the computer system 120, in accordance with some example embodiments. The computer system 120 typically includes one or more processing units (CPUs) 202, one or more network interfaces 122, memory 212, and one or more communication buses 214 for interconnecting these components.

Memory 212 includes high-speed random access memory, such as Dynamic Random Access Memory (DRAM), Static Random Access Memory (SRAM), Double Data Rate Random Access Memory (DDR RAM) or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, comprises a non-transitory computer-readable storage medium.

In some example embodiments, memory 212 or the computer-readable storage medium of memory 212 stores the following programs, modules, and data structures, or a subset thereof:

- an operating system 130 that includes procedures for handling various basic system services and for performing hardware-dependent tasks;
- optionally a network communication module 210 that is used for connecting the computer system 120 to other computers via the one or more network interface module(s) 122 (wired or wireless) and one or more communication networks (not shown), such as the Internet, other WANs, LANs, metropolitan area networks, etc.;
- optionally a display module 220 for enabling the information generated by the operating system 130 to be presented visually as needed;
- one or more system application modules 221 for handling various aspects of storing and recovering data, including but not limited to:
  - a virtual machine 140 for emulating a particular real or hypothetical computer system or computer architecture primarily through software (e.g., Java Virtual Machine™) such that instructions can be written for the virtual machine 140 and the virtual machine 140 will allow the instructions to be executed on the computer system (e.g., the computer system 120 in FIG. 1);
  - a reception module 222 for receiving an interrupt request in the virtual machine 140;

a search module 148 for analyzing each instruction in a plurality of instructions in order until an appropriate safe point instruction is determined;

an instruction replacement module 150 for removing, once one or more appropriate safe point instructions have been identified by the search module 148, the identified safe point instruction from its original position in the series of instructions (e.g., in memory) and replacing that instruction with one or more instructions that result in a interrupt handler being called;

a resume module 224 for resuming execution of the series of instructions (beginning at the first instruction) after a search has been conducted, an appropriate safe point instruction has been identified, and the appropriate safe point instruction has been replaced with one or more interrupt handler instructions;

a removal module 226 for removing the one or more interrupt handler instructions from the series of instructions after the interrupt handler has completed;

a reinsertion module 228 for reinserting the identified safe point instruction that had been previously replaced in the series of instructions once the interrupt handler is complete;

a storage module 230 for storing an instruction and information about where the instruction is, or should be, stored in memory;

an analysis module 232 for determining, based on instruction type and the context of the series of instructions (e.g., the program), whether a particular instruction is a good safe point candidate; and a determination module 234 for determining whether a given instruction is included in a list of potential safe point instructions by comparing the given instruction to the list of predetermined possible safe points; and a system data module(s) 240 for storing data at the computer system 120, including but not limited to:

instruction list data 132 for storing a series of instructions to be executed by the computer system (e.g., the computer system 120 in FIG. 1) through the virtual machine 140;

determined safe points data 134 including data describing one or more instructions determined to be safe point candidates; and replacement data storage 136 including data describing one or more replaced instructions including the replaced instructions themselves and information detailing where the instruction was originally stored (e.g., at a specific address in memory) so it can be returned once the interrupt handler is complete.

Figure 3:
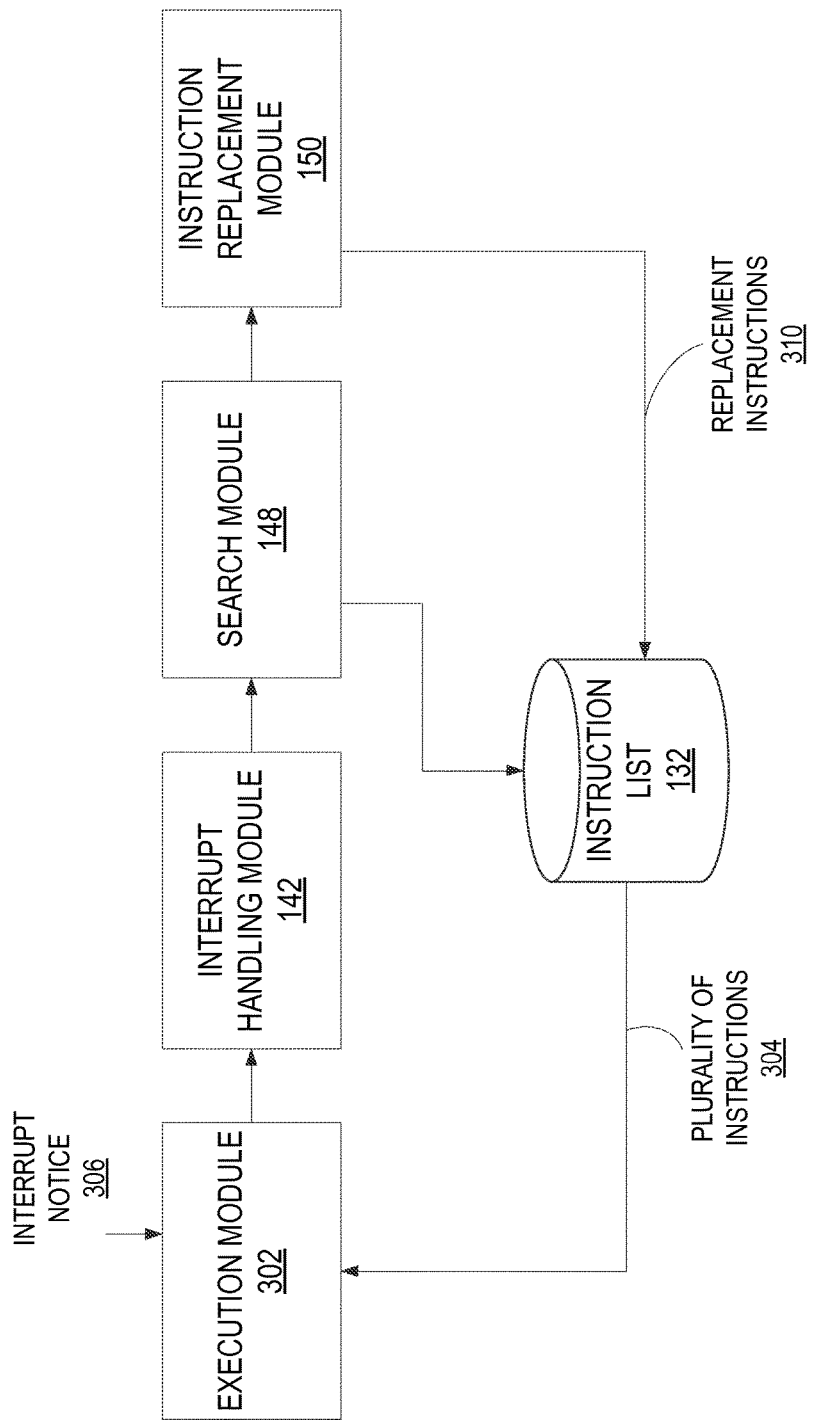
FIG. 3 depicts a block diagram of at least some components of a virtual machine, in accordance with some example embodiments.

FIG. 3 depicts a block diagram of at least some components of virtual machine 140, in accordance with some example embodiments. The virtual machine 140 is shown to include an execution module 302 that receives instructions (e.g., plurality of instructions 304) from the instruction list data 132. The instruction list is a series of instructions in memory that are to be executed mostly in the order in which they are stored. The instruction list may include potential branches and conditional instructions. Thus, more than one possible series of instructions is possible in some example embodiments.

In some example embodiments, the interrupt handling module 142 receives an interrupt notice 306. The interrupt notice 306 can be generated from a source outside of the virtual machine 140. For example, the operating system 130 of the computer system (e.g., the computer system 120 in FIG. 1) generates the interrupt notice 306 (or interrupt signal) based on operations that need to occur at the computer system (e.g., the computer system 120 in FIG. 1). It may halt the execution module 302 and transfer control to the interrupt handling module 142.

In response to receiving an interrupt notice 306, the interrupt handling module 142 notes the current instruction (e.g., the instruction that was to be executed but did not complete when the execution module 302 is halted), and transmits the current instruction location to the search module 148.

The search module 148 receives the current instruction location from the interrupt handling module 142, wherein the current instruction is the instruction that was to be executed by the execution module 302 but did not complete when the execution module 302 was halted. Using the current instruction as a starting point, the search module 148 accesses the instruction list data 132 to identify an appropriate safe point instruction. The search module 148 then steps through the instruction list one instruction at a time and compares each instruction it finds to a list of already identified safe point instructions (e.g., stored in a potential safe point instruction list).

Once an appropriate safe point instruction is identified, the search module 148 ceases searching and reports the identified safe point instruction to the instruction replacement module 150.

In some example embodiments, the instruction list data 132 includes a branch or optional instruction (e.g., where more than one instruction has the potential to be the next instruction). In this case, the search module 148 identifies a potential safe point instruction for each potential series of instruction (e.g., if there are four potential sequences of instructions, the search module 148 identifies four safe point instructions).

The instruction replacement module 150 replaces the one or more identified safe point instructions with one or more alternate instructions that cause an interrupt handler (e.g., any series of instructions that deal with the received interrupt) to be executed. In some cases, a trap instruction is inserted and is used to initiate an interrupt handler.

In some example embodiments, the instruction replacement module 150 edits the instruction list data 132 by replacing the one or more identified safe point instructions in the instruction list data 132 with one or more instructions that result in execution of the interrupt handler. The instruction list data 132 may include a series of computer instructions stored in memory, and replacing instructions includes would then include removing the current instructions from their place in memory and inserting replacement instructions at the same point in memory. The instruction replacement module 150 then transmits the replacement instructions 310 to the instruction list 132.

Once the instructions have been replaced, the execution module 302 then resumes execution at the same point at which it was halted. For example, if the execution module 302 was halted during Instruction C, after the replacement has finished, the execution module 302 will either continue execution of Instruction C (if execution of Instruction C did not complete) or the instruction immediately following Instruction C (if Instruction C executed to completion before the interrupt was received).

Figure 4A:
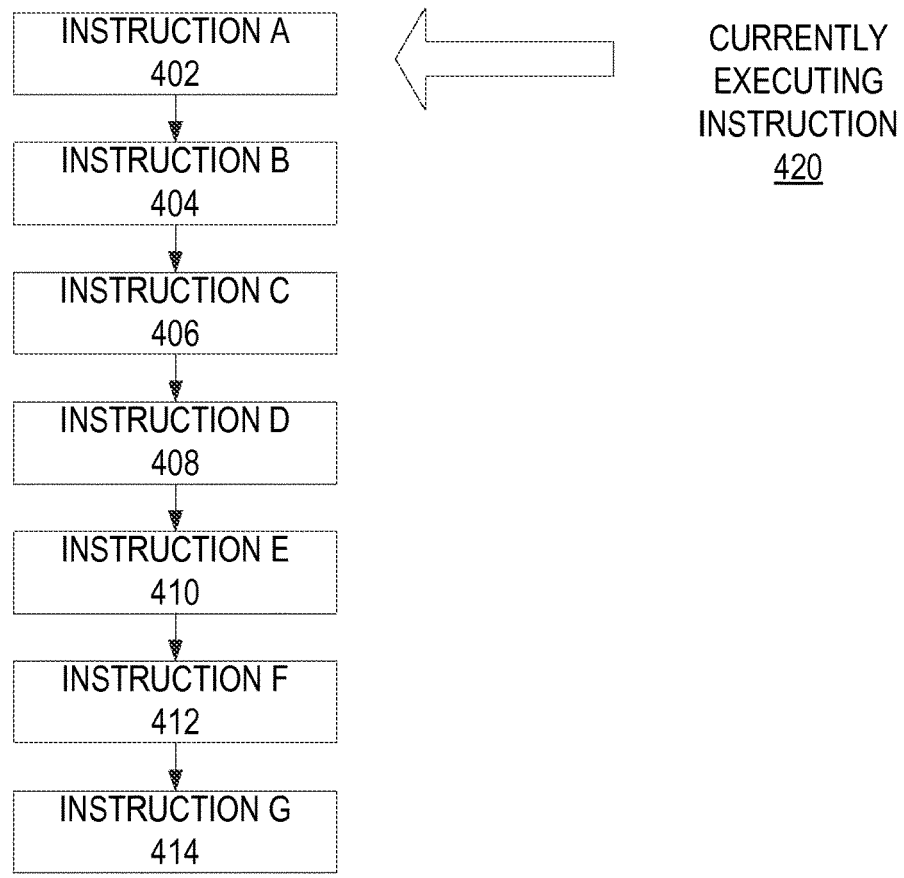
FIGS. 4A-4I are flow diagrams illustrating a method, in some example embodiments, for increasing efficiency and responsiveness by automatically inserting interrupt handler instructions as needed.

FIG. 4A is a flow diagram illustrating a method, in some example embodiments, for increasing efficiency and responsiveness by automatically inserting interrupt handler instructions as needed. Each of the operations shown in FIG. 4A may correspond to instructions stored in a computer memory or computer-readable storage medium. In some example embodiments, the method described in FIG. 4A is performed by the computer system 120 shown in FIG. 1. However, other systems and configurations can be used to implement the method described in FIG. 4A.

In some example embodiments, the method is performed at a computer system (e.g., the computer system 120 in FIG. 1) including one or more processors and memory storing one or more programs for execution by the one or more processors.

A series of instructions (e.g., 402 to 414) is stored (e.g., in instruction list data 132 seen in FIG. 1) and ready to be executed by the computer system (e.g., the computer system 120 in FIG. 1) (via the virtual machine 140). In some example embodiments, the instructions are executed a single instruction at a time in the order in which they are stored (e.g., the order that they are listed in memory). In this example, Instruction A 402 is the currently executed instruction. Thus, the computer system (e.g., the computer system 120 in FIG. 1) is currently performing the instruction described by Instruction A 402.

Figure 4B:
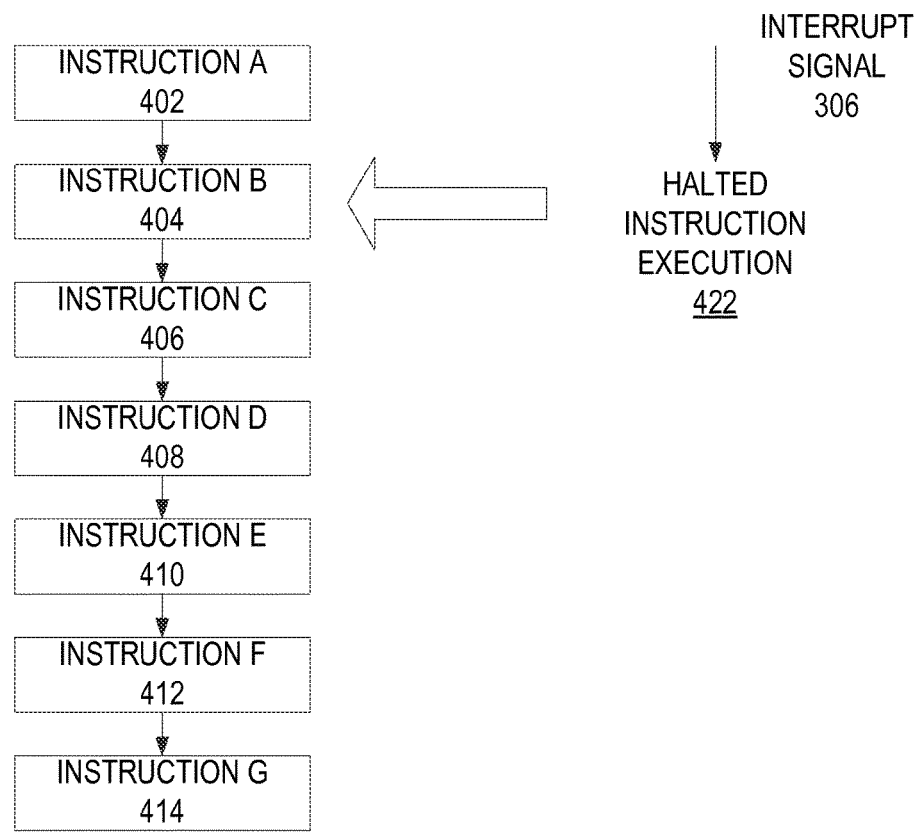

FIG. 4B is a flow diagram illustrating a method, in some example embodiments, for increasing efficiency and responsiveness by automatically inserting interrupt handler instructions as needed and continues from FIG. 4A.

In some example embodiments, the method is performed at a computer system (e.g., the computer system 120 in FIG. 1) including one or more processors and memory storing one or more programs for execution by the one or more processors.

While executing one of the instructions being executed on the computer system (e.g., the computer system 120 in FIG. 1), the virtual machine (e.g., the virtual machine 140 in FIG. 1) receives an interrupt signal 306 (FIG. 3). The interrupt signal 306 is a message that notifies the virtual machine (e.g., the virtual machine 140 in FIG. 1) that the resources of the computer system (e.g., the computer system 120 in FIG. 1) are needed by another function of the computer system (e.g., the computer system 120 in FIG. 1).

In some example embodiments, when an interrupt signal 306 is received, the virtual machine (e.g., the virtual machine 140 in FIG. 1) halts execution of instruction of the current instruction. In this example, the virtual machine (e.g., the virtual machine 140 in FIG. 1) was executing Instruction B 404 when it received the interrupt signal 306. Thus virtual machine (e.g., the virtual machine 140 in FIG. 1) halts execution of Instruction B.

Figure 4C:
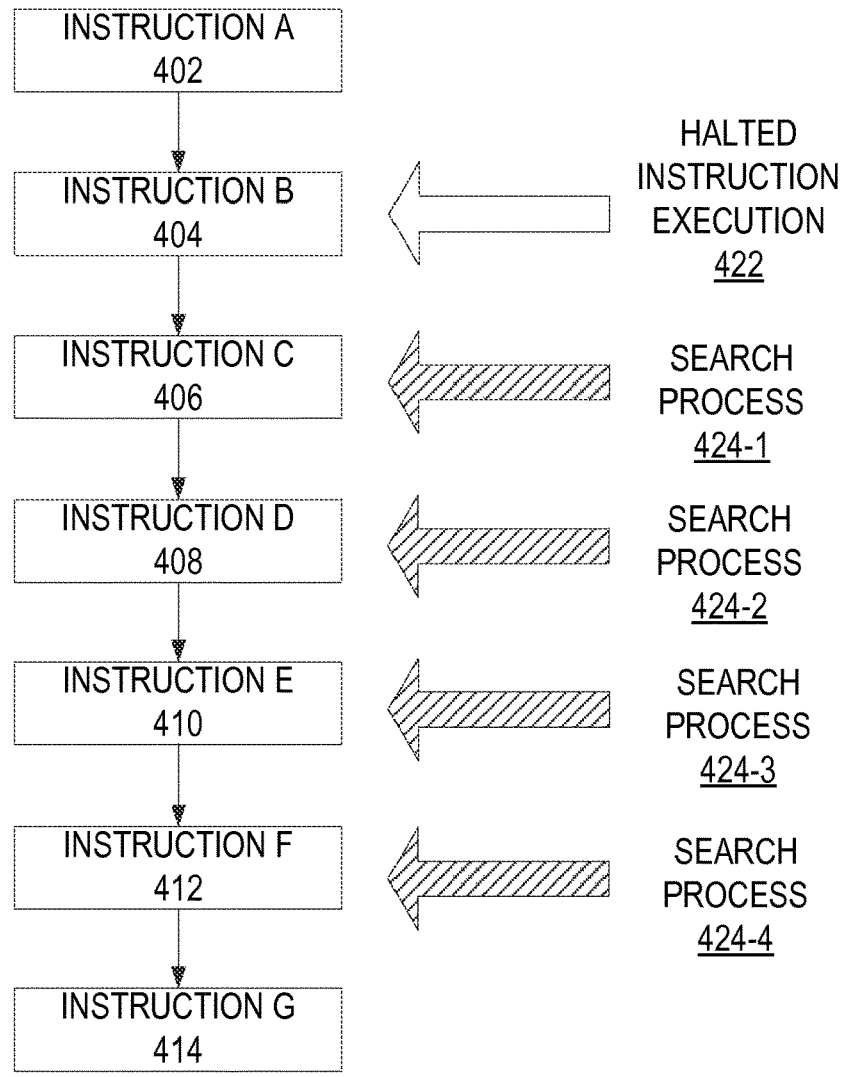

FIG. 4C is a flow diagram illustrating a method, in some example embodiments, for increasing efficiency and responsiveness by automatically inserting interrupt handler instructions as needed and continues from FIGS. 4A and 4B.

In some example embodiments, the method is performed at a computer system (e.g., the computer system 120 in FIG. 1) including one or more processors and memory storing one or more programs for execution by the one or more processors.

In this example, the virtual machine (e.g., the virtual machine 140 in FIG. 1) has halted execution of the Instruction B 422. Once execution of an instruction has been halted, the virtual machine (e.g., the virtual machine 140 in FIG. 1) searches the list of instructions (e.g., 406 to 414) to identify the next possible safe point. A safe point is an instruction at which the series of instructions can be safely interrupted to run a specific task. Determining whether an instruction is a safe point includes, but is not limited to, determining the instruction, the context of the series of instructions (e.g., the program), whether important data is currently stored in one or more registers, and so on.

In this example, the virtual machine (e.g., the virtual machine 140 in FIG. 1) searches each instruction, one at a time, in sequential order. First the search process 424-1 analyzes Instruction C 406 but determines that Instruction C 406 is not a viable safe point (e.g., it is not listed in a predetermined list of viable safe points). Similarly, the search process 424-2 determines that Instruction D 408 is not a viable safe point. The search process 424-3 determines that Instruction E 410 is not a viable safe point.

In this example, search process 424-4 determines that Instruction F 412 is a viable safe point instruction. The virtual machine (e.g., the virtual machine 140 in FIG. 1) no longer has to search additional instructions to determine safe points because a safe point has been identified. In some example embodiments, the series of instructions includes more than one possible series of instructions (e.g., dependent on the result of a conditional operator). In this case, each possible series of instructions must be searched to identify a safe point in each.

Figure 4D:
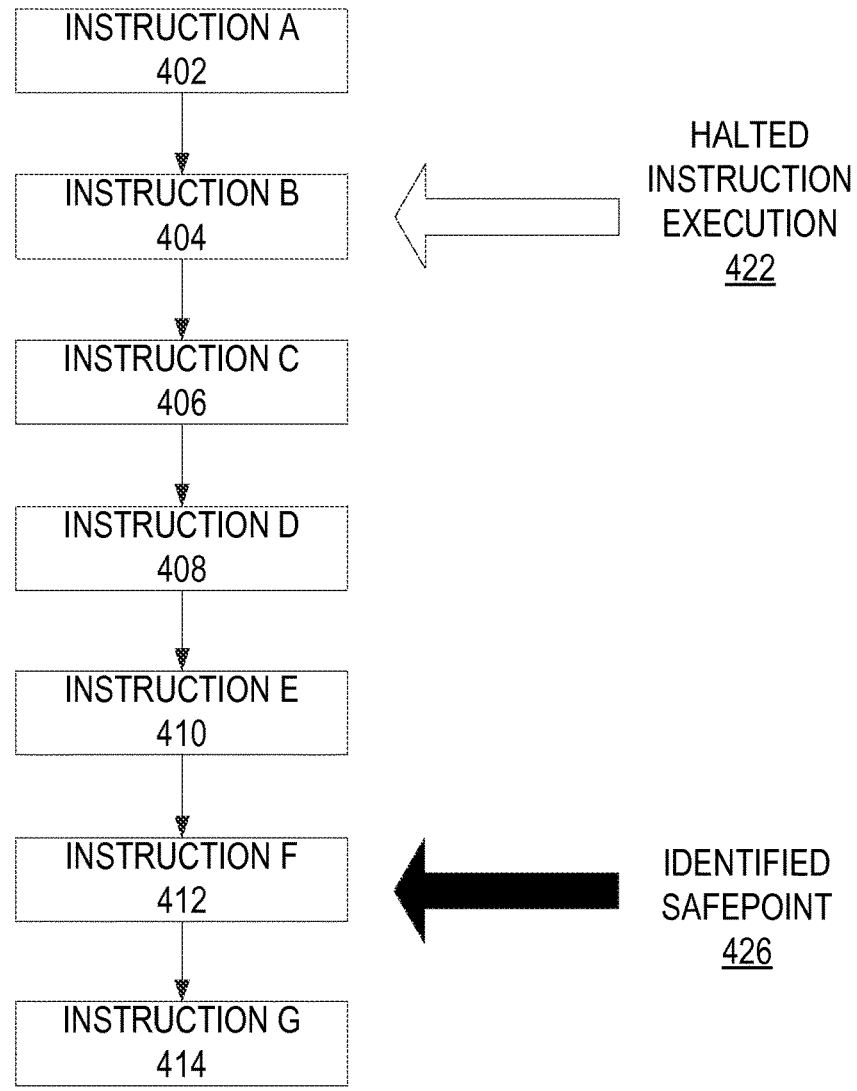

FIG. 4D is a flow diagram illustrating a method, in some example embodiments, for increasing efficiency and responsiveness by automatically inserting interrupt handler instructions as needed and continues from FIGS. 4A-4C.

In some example embodiments, the method is performed at a computer system (e.g., the computer system 120 in FIG. 1) including one or more processors and memory storing one or more programs for execution by the one or more processors.

In this example, the virtual machine (e.g., the virtual machine 140 in FIG. 1) has halted execution of the Instruction 422 and identified a safe point 426 at Instruction F 412. Identification of Instruction F 412 as a safe point included comparing Instruction F 412 to a list of predetermined safe points. In another example, the virtual machine (e.g., the virtual machine 140 in FIG. 1) determines in real time (e.g. during Just-In-Time compilation) which instructions are viable safe points based on the type of instruction, the context of the program, and so on.

Figure 4E:
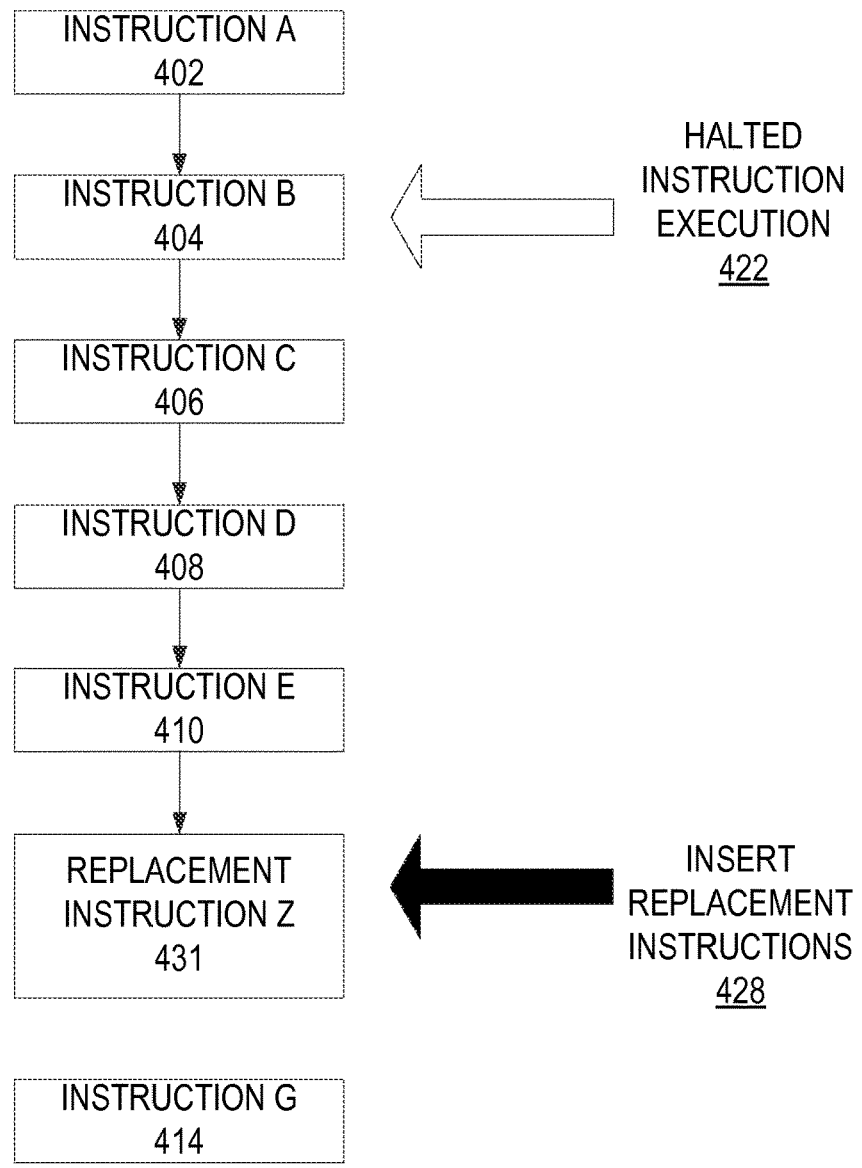

FIG. 4E is a flow diagram illustrating a method, in some example embodiments, for increasing efficiency and responsiveness by automatically inserting interrupt handler instructions as needed and continues from FIGS. 4A-4D.

In some example embodiments, the method is performed at a computer system (e.g., the computer system 120 in FIG. 1) including one or more processors and memory storing one or more programs for execution by the one or more processors.

In this example, the virtual machine (e.g., the virtual machine 140 in FIG. 1) has halted execution of the Instruction 422 and identified a safe point instruction. The virtual machine (e.g., the virtual machine 140 in FIG. 1) then replaces the identified safe point instruction (Instruction F 412) with replacement instructions 431

In this example, Instruction F 412 was identified as a safe point instruction. The virtual machine (e.g., the virtual machine 140 in FIG. 1) then inserts replacement instructions 428, such that replacement instruction Z 430 now follows Instruction E 410. Replacement instruction Z 430 does not point to Instruction G 414 (e.g., Instruction G 414 will not immediately follow replacement instruction Z 430). Instead, another instruction or set of instructions (not shown) will follow replacement instruction Z 430 and will handle the interrupt signal 306 that was received.

Figure 4F:
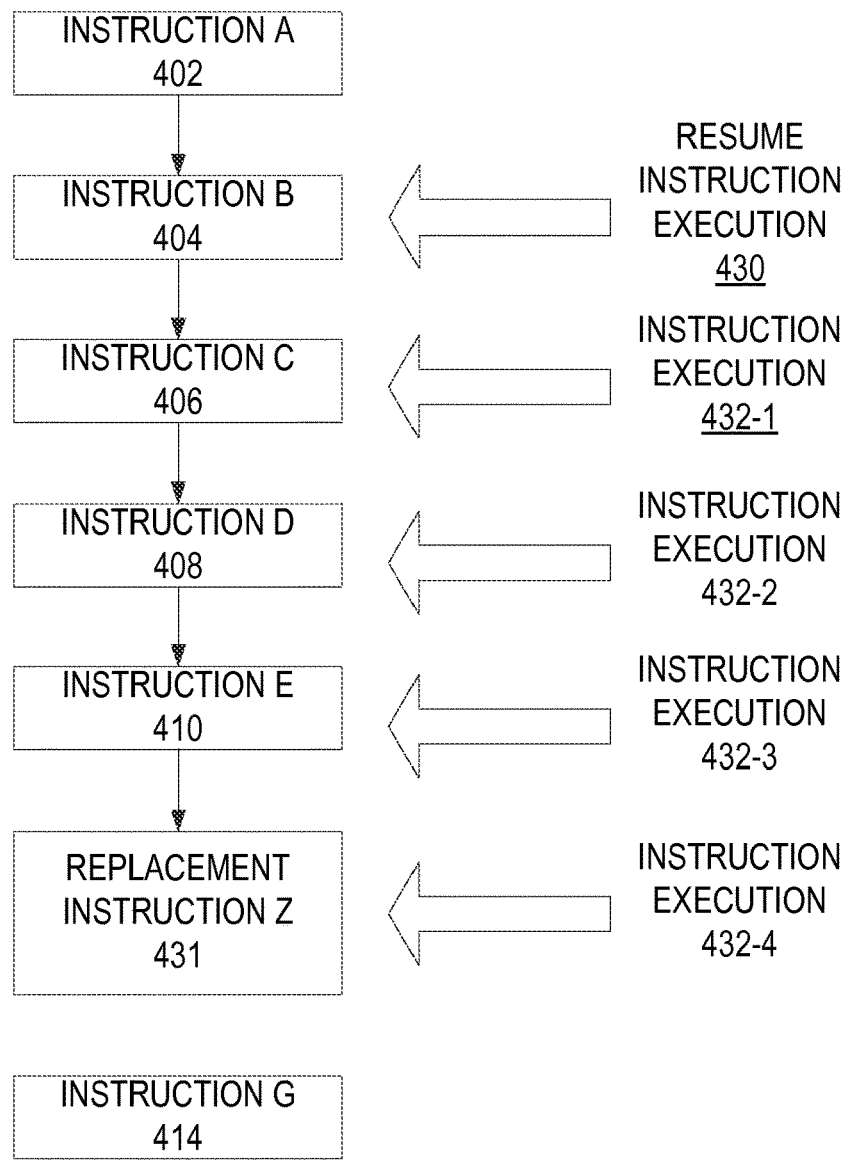

FIG. 4F is a flow diagram illustrating a method, in some example embodiments, for increasing efficiency and responsiveness by automatically inserting interrupt handler instructions as needed and continues from FIGS. 4A-4E.

In some example embodiments, the method is performed at a computer system (e.g., the computer system 120 in FIG. 1) including one or more processors and memory storing one or more programs for execution by the one or more processors.

In this example, the virtual machine (e.g., the virtual machine 140 in FIG. 1) then resumes instruction execution 430. As a first step, the instruction that was halted is executed to completion (e.g., Instruction B 404 is this example).

The virtual machine (e.g., the virtual machine 140 in FIG. 1) continues executing instructions until the replacement instruction Z 431 is reached. Thus, instructions C-E are executed as normal by instruction execution steps 432-1 to 432-3. The virtual machine (e.g., the virtual machine 140 in FIG. 1) then executes replacement instruction Z 431 by instruction execution step 432-4. In some example embodiments, the replacement instruction Z 431 is a trap instruction or similar instruction.

Figure 4G:
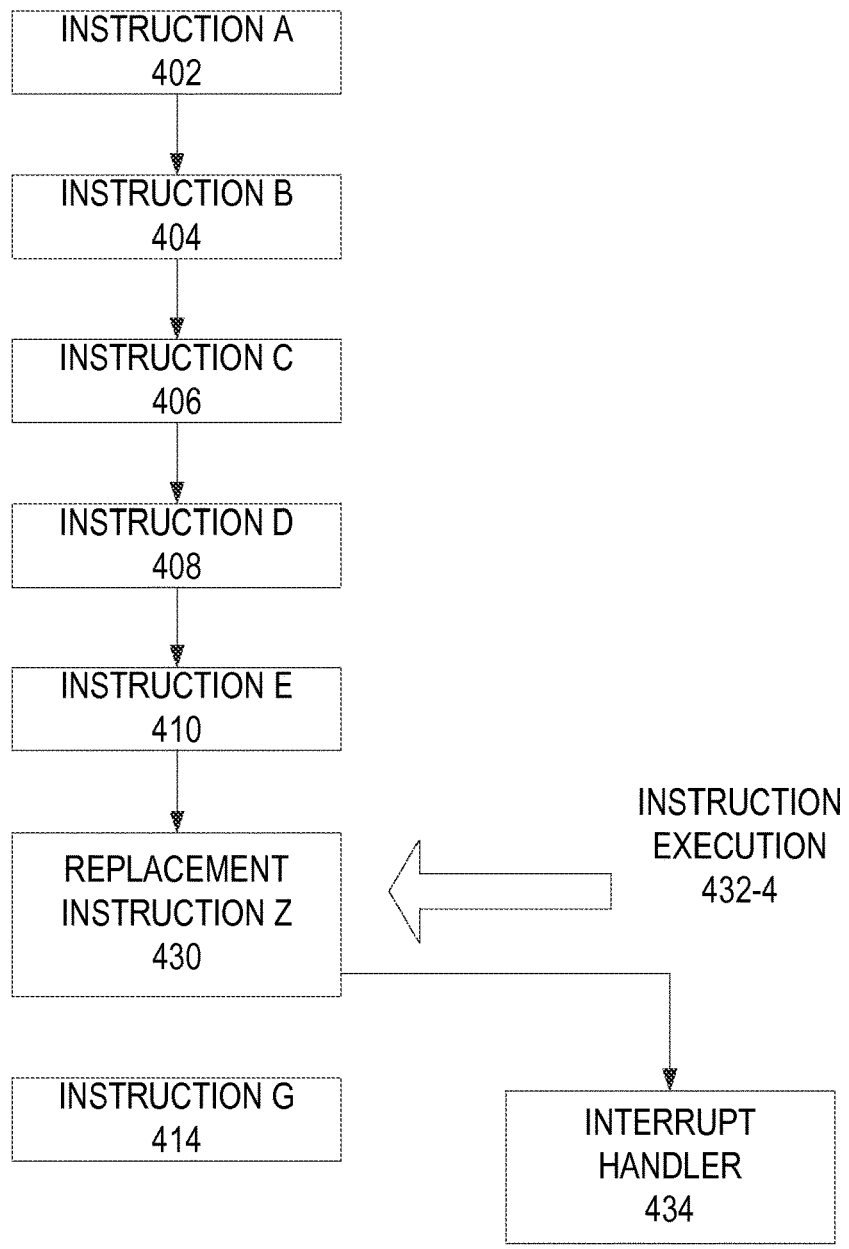

FIG. 4G is a flow diagram illustrating a method, in some example embodiments, for increasing efficiency and responsiveness by automatically inserting interrupt handler instructions as needed and continues from FIGS. 4A-4F.

In some example embodiments, the method is performed at a computer system (e.g., the computer system 120 in FIG. 1) including one or more processors and memory storing one or more programs for execution by the one or more processors.

In the depicted example, when replacement instruction Z 430 is executed at step 432-4, an interrupt handler 434 is called (or executed). The interrupt handler 434 deals with whatever situation initiated the sending of the interrupt signal in the first place. Once the interrupt handler 434 has completed, the virtual machine (e.g., the virtual machine 140 in FIG. 1) again regains control of the processor and begins again to execute instructions from its list of instructions.

Figure 4H:
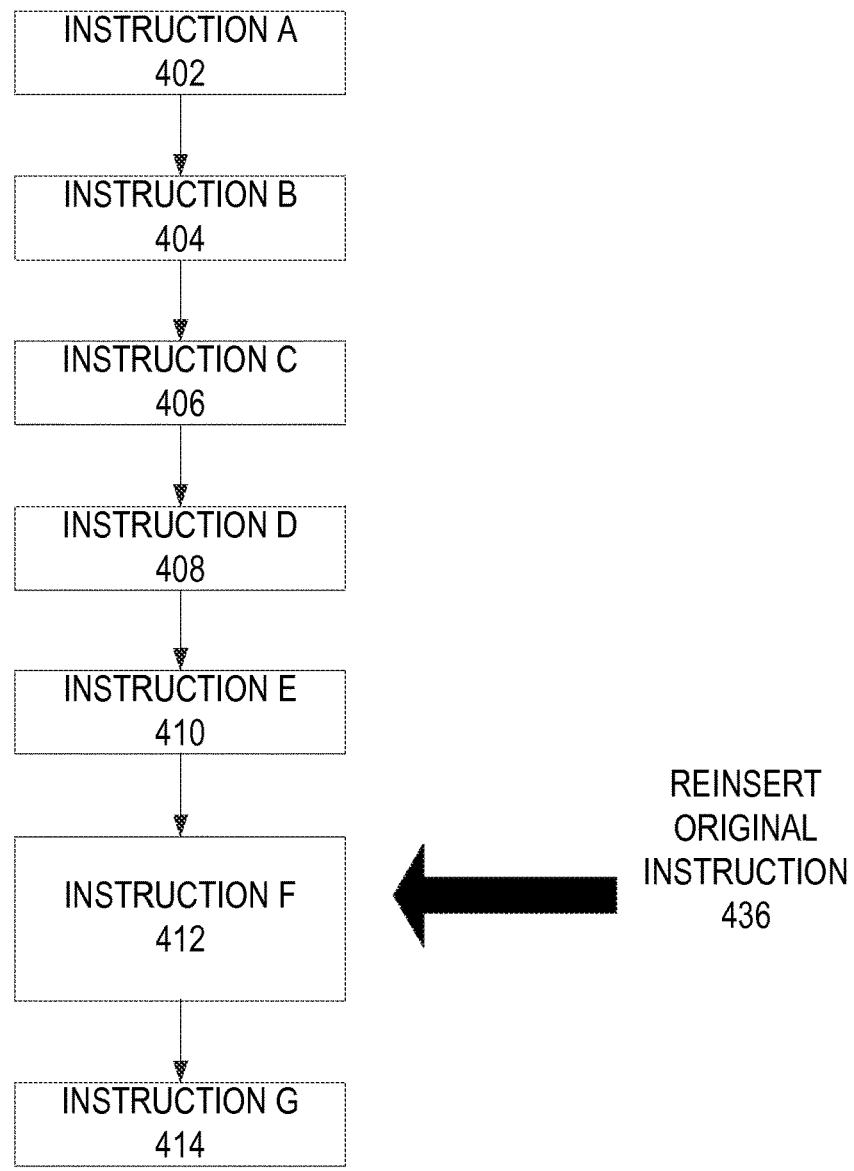

FIG. 4H is a flow diagram illustrating a method, in some example embodiments, for increasing efficiency and responsiveness by automatically inserting interrupt handler instructions as needed and continues from FIGS. 4A-4G.

In some example embodiments, the method is performed at a computer system (e.g., the computer system 120 in FIG. 1) including one or more processors and memory storing one or more programs for execution by the one or more processors.

In the depicted example, the virtual machine (e.g., the virtual machine 140 in FIG. 1) reinserts the original instruction 436 into the instruction list at the exact same place in the list (e.g., the same place in memory) from where it was originally removed. In this example, safe point Instruction F 412 is reinserted into the list of instructions at its original location (e.g., between instruction E 410 and instruction G 414).

Figure 4I:
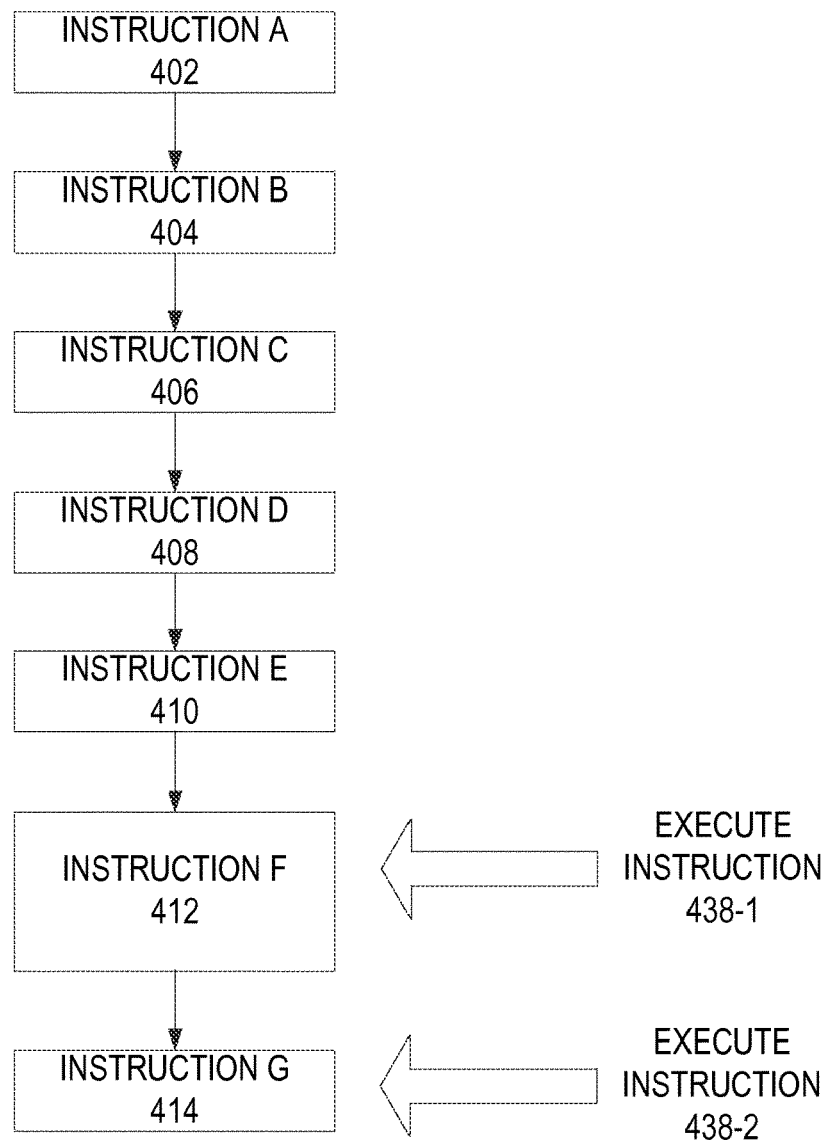

FIG. 4I is a flow diagram illustrating a method, in some example embodiments, for increasing efficiency and responsiveness by automatically inserting interrupt handler instructions as needed and continues from FIGS. 4A-4H.

In some example embodiments, the method is performed at a computer system (e.g., the computer system 120 in FIG. 1) including one or more processors and memory storing one or more programs for execution by the one or more processors.

The virtual machine (e.g., the virtual machine 140 in FIG. 1) resumes execution of instructions in the list of instructions. The virtual machine (e.g., the virtual machine 140 in FIG. 1) begins execution with the safe point instruction that was recently reinserted back into the list of instructions when the interrupt handler 434 completed. In the present example, Instruction F 412 is executed at step 438-1. Thereafter, the virtual machine (e.g., the virtual machine 140 in FIG. 1) executes, at step 438-2, the next instruction in the list of instructions, which in this case is Instruction G 414.

Figure 5A:
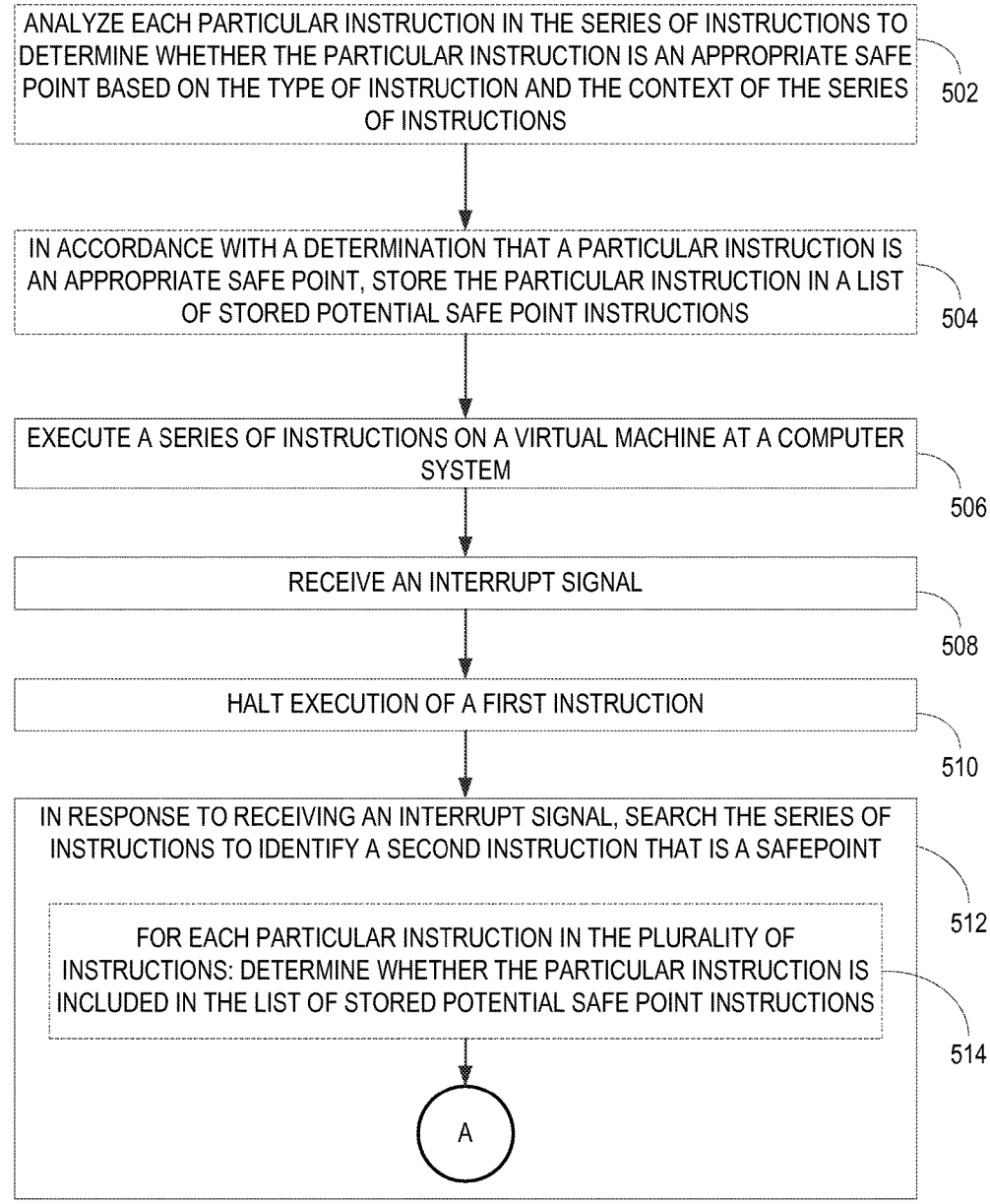
FIGS. 5A-5C are flow diagrams illustrating a method, in accordance with some example embodiments, for increasing efficiency and responsiveness by automatically inserting interrupt handler instructions as needed.

FIG. 5A is a flow diagram illustrating a method, in accordance with some example embodiments, for increasing efficiency and responsiveness by automatically inserting interrupt handler instructions as needed. Each of the operations shown in FIG. 5A may correspond to instructions stored in a computer memory or computer-readable storage medium. Optional operations are indicated by dashed lines (e.g., boxes with dashed-line borders). In some embodiments, the method described in FIG. 5A is performed by the computer system (e.g., the computer system 120 in FIG. 1). However, the method described can also be performed by any other suitable configuration of electronic hardware.

In some embodiments the method is performed at a computer system (e.g., the computer system 120 in FIG. 1) including one or more processors and memory storing one or more programs for execution by the one or more processors.

The virtual machine (e.g., the virtual machine 140 in FIG. 1) analyzes (502) each particular instruction in a series of instructions to determine whether the particular instruction is an appropriate safe point based on the type of instruction and the context of the series of instructions at the point where the particular instruction is executed. For example, when the series of instructions is compiled before execution, each instruction is analyzed to determine whether it would make a good safe point. For example, certain types of instructions (e.g., branch instruction and so on) are often identified as safe break points. In other example embodiments, the context of an instruction (e.g., what information is being stored in registers, whether calculations will have to be done again, and so on) is used to determine whether the given instruction is a good safe point.

In some example embodiments, in accordance with a determination that a particular instruction is an appropriate safe point, the virtual machine (e.g., the virtual machine 140 in FIG. 1) stores (504) the particular instruction in a list of stored potential safe point instructions. For example, once all instructions in a list of instructions have been examined, all potential safe point instructions are listed in file or list of instructions. Each entry in the list includes the type of instruction, the values associated with the instruction and its location in the list of instructions (e.g., in memory) will be stored. For example, an ADD instruction is added to the list of potential safe point instructions and the values being added will be stored along with the instruction location in memory. Thus, instructions can be compared against the predetermined list when a safe point instruction needs to be found.

The computer system (e.g., the computer system 120 in FIG. 1) executes (506) a series of instructions on a virtual machine (e.g., the virtual machine 140) running on the computer system (e.g., the computer system 120 in FIG. 1). In some example embodiments, the virtual machine is a software emulation of a particular computer system or hypothetical computer system. A virtual machine allows a user to write computer instructions for the virtual machine and then use the virtual machine to run the computer instructions on a plurality of different systems. The virtual machine converts the instructions to system-specific instructions for each individual computer system. For example, the Java™ virtual machine allows programs written in the Java™ programming language to be run on any system one which the Java™ virtual machine is able to run.

While executing a first instruction in the series of instructions, the virtual machine (e.g., the virtual machine 140 in FIG. 1) receives (508) an interrupt signal. An interrupt signal is a notice to the virtual machine (e.g., the virtual machine 140 in FIG. 1) that another computer system (e.g., the computer system 120 in FIG. 1) function requires use of the processing unit (e.g., to perform computer system vital operations and so on).

In response to receiving the interrupt signal, the processor or Operating System halts (510) execution of the first instruction. The Interrupt Handling Module of the virtual machine (e.g., the virtual machine 140 in FIG. 1) saves the state of the virtual machine (e.g., the virtual machine 140 in FIG. 1) prior to halting execution of the first instruction to be used when resuming execution of the instructions in the future.

In response to receiving an interrupt signal, the virtual machine (e.g., the virtual machine 140 in FIG. 1) searches (512) the series of instructions to determine a second instruction that is a safe point. For example, the virtual machine (e.g., the virtual machine 140 in FIG. 1) starts a search process that steps through the series of instructions, one instruction at a time, and determines, for each instruction, whether that instruction is a viable safe point candidate.

As part of determining a second instruction that is a safe point to halt execution of the series of instructions, for each particular instruction in the plurality of instructions, the virtual machine (e.g., the virtual machine 140 in FIG. 1) determines (514) whether the particular instruction is included in the list of stored potential safe point instructions. For example, the virtual machine (e.g., the virtual machine 140 in FIG. 1) analyzes each instruction in the list of instructions in the order that they would be executed and compares it against the predetermined list of potential safe point instructions.

Figure 5B:
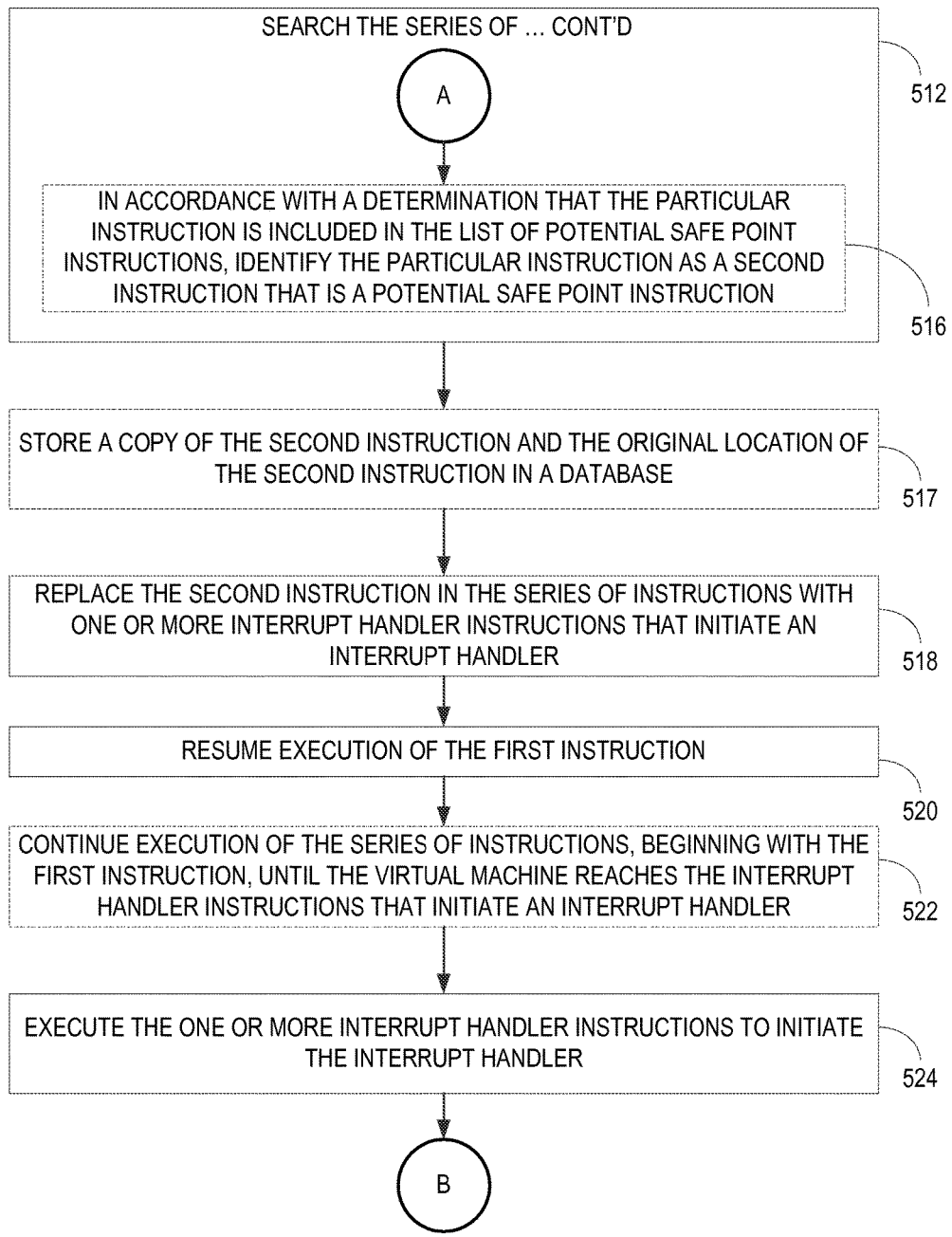

FIG. 5B is a flow diagram illustrating a method, in accordance with some example embodiments, for increasing efficiency and responsiveness by automatically inserting interrupt handler instructions as needed. Each of the operations shown in FIG. 5B may correspond to instructions stored in a computer memory or computer-readable storage medium. Optional operations are indicated by dashed lines (e.g., boxes with dashed-line borders). In some embodiments, the method described in FIG. 5B is performed by a computer system (e.g., the computer system 120 in FIG. 1). However, the method described can also be performed by any other suitable configuration of electronic hardware. FIG. 5B continues the method of FIG. 5A.

In some embodiments the method is performed at a computer system (e.g., the computer system 120 in FIG. 1) including one or more processors and memory storing one or more programs for execution by the one or more processors.

In accordance with a determination that the particular instruction is included in the list of potential safe point instructions, the particular instruction is identified (516) as a second instruction that is a potential safe point.

The virtual machine (e.g., the virtual machine 140 in FIG. 1) stores (517) a copy of the second instruction and the original location of the second instruction in a database.

In some example embodiments, the virtual machine (e.g., the virtual machine 140 in FIG. 1) replaces (518) the second instruction in the series of instructions with one or more interrupt handler instructions that initiate an interrupt handler. For example, the second instruction is replaced (in a specific location in memory) with a trap instruction (or other instruction). The virtual machine (e.g., the virtual machine 140 in FIG. 1) resumes (520) execution of the first instruction.

The virtual machine (e.g., the virtual machine 140 in FIG. 1) continues (522) execution of the series of instructions, beginning with the first instruction, until the virtual machine reaches the one or more interrupt handler instructions that initiate an interrupt handler. For example, the virtual machine (e.g., the virtual machine 140 in FIG. 1) executes the first instruction and then continues to execute each subsequent instruction in sequence until it reaches the inserted instructions.

The virtual machine (e.g., the virtual machine 140 in FIG. 1) then executes (524) the one or more one or more interrupt handler instructions to initiate the interrupt handler.

Figure 5C:
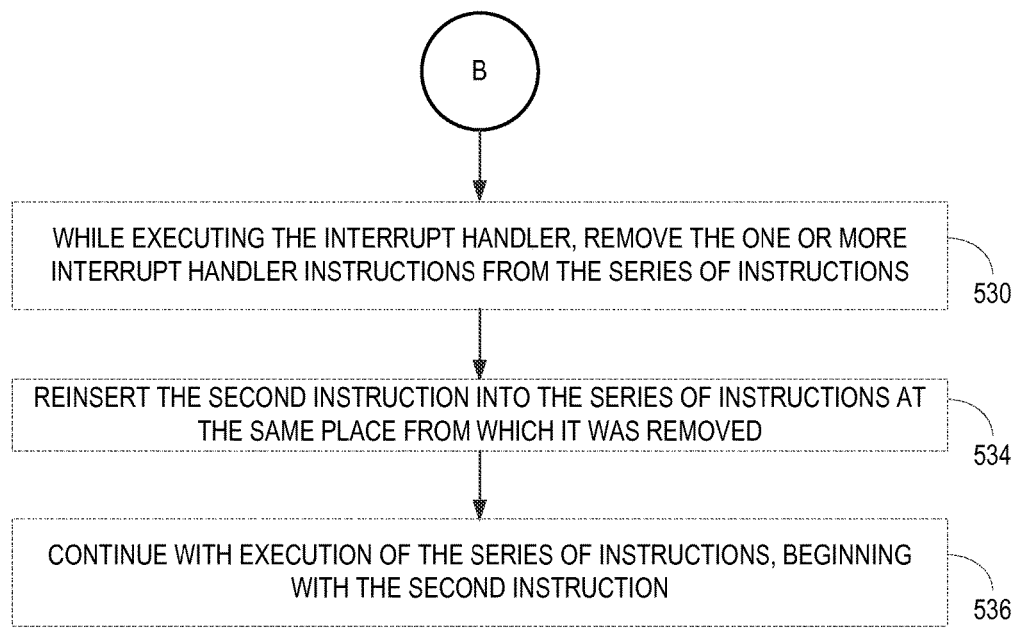

FIG. 5C is a flow diagram illustrating a method, in accordance with some example embodiments, for increasing efficiency and responsiveness by automatically inserting interrupt handler instructions as needed. Each of the operations shown in FIG. 5C may correspond to instructions stored in a computer memory or computer-readable storage medium. Optional operations are indicated by dashed lines (e.g., boxes with dashed-line borders). In some embodiments, the method described in FIG. 5C is performed by a computer system (e.g., the computer system 120 in FIG. 1). However, the method described can also be performed by any other suitable configuration of electronic hardware. FIG. 5C continues the method in FIGS. 5A and 5B.

In some embodiments the method is performed at a computer system (e.g., the computer system 120 in FIG. 1) including one or more processors and memory storing one or more programs for execution by the one or more processors.

During the execution of the interrupt handler, the virtual machine (e.g., the virtual machine 140 in FIG. 1) removes (530) the one or more interrupt handler instructions from the series of instructions. For example, if a trap instruction had been inserted in place of the second instruction (e.g., in the same place in memory as the second instruction), the trap instruction is removed before the interrupt handler is complete.

The virtual machine (e.g., the virtual machine 140 in FIG. 1) reinserts (534) the second instruction into the series of instructions at the same place (e.g., in memory) from which it was removed.

In some example embodiments, reinserting includes accessing the stored second instruction and using the stored original location to identify the correct location to reinsert the second instruction.

In some example embodiments, after performing a task at the safe point, the virtual machine (e.g., the virtual machine 140 in FIG. 1) continues (536) with execution of the series of instructions, beginning with the second instruction. Thus, the series of instructions continues to be executed as if no interruption ever occurred.

Software Architecture

Figure 6:
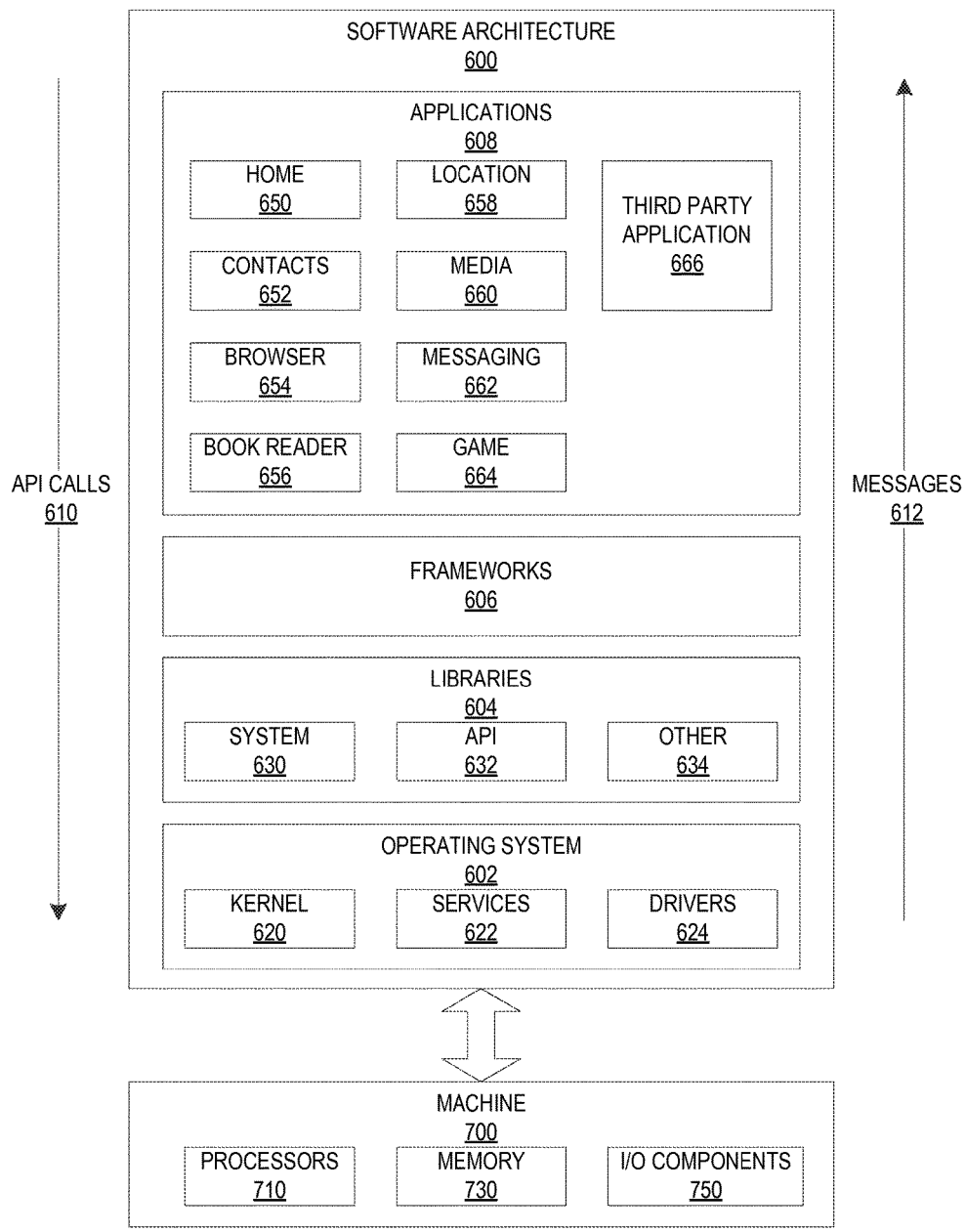
FIG. 6 is a block diagram illustrating an architecture of software, which may be installed on any one or more of the devices of a computer system.

FIG. 6 is a block diagram illustrating an architecture of software 600, which may be installed on any one or more of the devices of FIG. 1 (e.g., the computer system 120). FIG. 6 is merely a non-limiting example of a software architecture that can be used in various computer systems described herein (e.g., the computer system 120 seen in FIG. 1) and it will be appreciated that many other architectures may be implemented to facilitate the functionality described herein. The software 600 may be executing on hardware such as machine 700 of FIG. 7 that includes processors 710, memory 730, and I/O components 750. In the example architecture of FIG. 6, the software 600 may be conceptualized as a stack of layers where each layer may provide particular functionality. For example, the software 600 may include layers such as an operating system 602, libraries 604, frameworks 606, and applications 608. Operationally, the applications 608 may invoke application programming interface (API) calls 610 through the software stack and receive messages 612 in response to the API calls 610.

The operating system 602 may manage hardware resources and provide common services. The operating system 602 may include, for example, a kernel 620, services 622, and drivers 624. The kernel 620 may act as an abstraction layer between the hardware and the other software layers. For example, the kernel 620 may be responsible for memory management, processor management (e.g., scheduling), component management, networking, security settings, and so on. The services 622 may provide other common services for the other software layers. The drivers 624 may be responsible for controlling and/or interfacing with the underlying hardware. For instance, the drivers 624 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 604 may provide a low-level common infrastructure that may be utilized by the applications 608. The libraries 604 may include system libraries 630 (e.g., C standard library) that may provide functions such as memory allocation functions, string manipulation functions, mathematic functions, and the like. In addition, the libraries 604 may include API libraries 632 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 604 may also include a wide variety of other libraries 634 to provide many other APIs to the applications 608.

The frameworks 606 may provide a high-level common infrastructure that may be utilized by the applications 608. For example, the frameworks 606 may provide various graphic user interface (GUI) functions, high-level resource management, high-level location services, and so forth. The frameworks 606 may provide a broad spectrum of other APIs that may be utilized by the applications 608, some of which may be specific to a particular operating system or platform.

The applications 608 include a home application 650, a contacts application 652, a browser application 654, a book reader application 656, a location application 658, a media application 660, a messaging application 662, a game application 664, and a broad assortment of other applications such as third party application 666. In a specific example, the third party application 666 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 666 may invoke the API calls 610 provided by the mobile operating system 602 to facilitate functionality described herein.

Example Machine Architecture and Machine-Readable Medium

Figure 7:
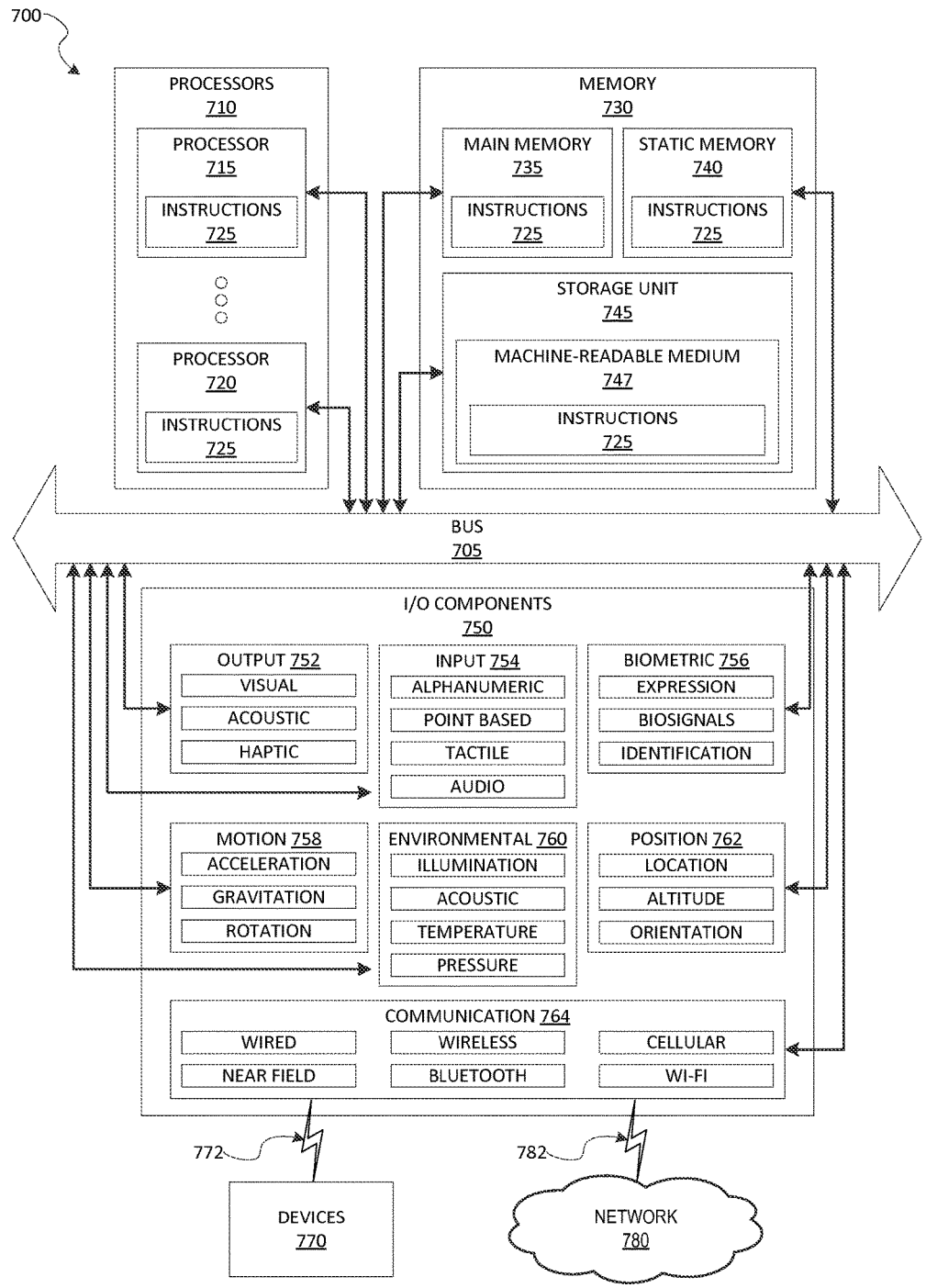
FIG. 7 is a block diagram illustrating components of a machine, according to some example embodiments.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 725 (e.g., software, a program, an application, an applet, an app, or other executable code) for causing the machine 700 to perform any one or more of the methodologies discussed herein may be executed. In alternative embodiments, the machine 700 operates as a standalone device or may be coupled (e.g., networked) to other machines. In a networked deployment, the machine 700 may operate in the capacity of a computer system or a third-party system in a server-client network environment, or as a peer machine in a peer-to-peer (or distributed) network environment. The machine 700 may comprise, but be not limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 725, sequentially or otherwise, that specify actions to be taken by machine 700. Further, while only a single machine 700 is illustrated, the term "machine" shall also be taken to include a collection of machines 700 that individually or jointly execute the instructions 725 to perform any one or more of the methodologies discussed herein.

The machine 700 may include processors 710, memory 730, and I/O components 750, which may be configured to communicate with each other via a bus 705. In an example embodiment, the processors 710 (e.g., a CPU, a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 715 and processor 720 that may execute instructions 725. The term "processor" is intended to include a multi-core processor that may comprise two or more independent processors (also referred to as "cores") that may execute instructions contemporaneously. Although FIG. 7 shows multiple processors 710, the machine 700 may include a single processor with a single core, a single processor with multiple cores (e.g., a multi-core process), multiple processors with a single core, multiple processors with multiples cores, or any combination thereof.

The memory 730 may include a main memory 735, a static memory 740, and a storage unit 745 accessible to the processors 710 via the bus 705. The storage unit 745 may include a machine-readable medium 747 on which are stored the instructions 725 embodying any one or more of the methodologies or functions described herein. The instructions 725 may also reside, completely or at least partially, within the main memory 735, within the static memory 740, within at least one of the processors 710 (e.g., within the processor's cache memory), or any suitable combination thereof, during execution thereof by the machine 700. Accordingly, the main memory 735, static memory 740, and the processors 710 may be considered as machine-readable media 747.

As used herein, the term "memory" refers to a machine-readable medium 747 able to store data temporarily or permanently and may be taken to include, but not be limited to, random-access memory (RAM), read-only memory (ROM), buffer memory, flash memory, and cache memory. While the machine-readable medium 747 is shown in an example embodiment to be a single medium, the term "machine-readable medium" should be taken to include a single medium or multiple media (e.g., a centralized or distributed database, or associated caches and servers) able to store instructions 725. The term "machine-readable medium" shall also be taken to include any medium, or combination of multiple media, that is capable of storing instructions (e.g., instructions 725) for execution by a machine (e.g., machine 700), such that the instructions, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 750 may include a wide variety of components to receive input, provide and/or produce output, transmit information, exchange information, capture measurements, and so on. It will be appreciated that the I/O components 750 may include many other components that are not shown in FIG. 7. In various example embodiments, the I/O components 750 may include output components 752 and/or input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, and/or other pointing instrument), tactile input components (e.g., a physical button, a touch screen that provide location and force of touches or touch gestures, and/or other tactile input components), audio input components (e.g., a microphone), and the like.

In further example embodiments, the I/O components 750 may include biometric components 756, motion components 758, environmental components 760, and/or position components 762 among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), and/or other components that may provide indications, measurements, and/or signals corresponding to a surrounding physical environment. The position components 762 may include location sensor components (e.g., a GPS receiver component), altitude sensor components (e.g., altimeters and/or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 and/or devices 770 via coupling 782 and coupling 772 respectively. For example, the communication components 764 may include a network interface component or other suitable device to interface with the network 780. In further examples, communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine and/or any of a wide variety of peripheral devices (e.g., a peripheral device coupled via a USB).

Moreover, the communication components 764 may detect identifiers and/or include components operable to detect identifiers. For example, the communication components 764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF48, Ultra Code, UCC RSS-2D bar code, and other optical codes), acoustic detection components (e.g., microphones to identify tagged audio signals), and so on. In additional, a variety of information may be derived via the communication components 764 such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 780 may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS)

network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or other type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 725 may be transmitted and/or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 725 may be transmitted and/or received using a transmission medium via the coupling 772 (e.g., a peer-to-peer coupling) to devices 770. The term "transmission medium" shall be taken to include any intangible medium that is capable of storing, encoding, or carrying instructions 725 for execution by the machine 700, and includes digital or analog communications signals or other intangible medium to facilitate communication of such software.

Furthermore, the machine-readable medium 747 is non-transitory (in other words, not having any transitory signals) in that it does not embody a propagating signal. However, labeling the machine-readable medium 747 as "non-transitory" should not be construed to mean that the medium 747 is incapable of movement; rather, the medium 747 should be considered as being transportable from one physical location to another. Additionally, since the machine-readable medium 747 is tangible, the medium 747 may be considered to be a machine-readable device.

TERM USAGE

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   executing, by at least one processor of a computer system, a series of instructions stored in a memory of the computer system;
   while executing a first instruction in the series of instructions, receiving an interrupt signal;
   in response to receiving the interrupt signal, halting execution of the first instruction;
   after halting execution of the first instruction, searching a first potential sequence of the series of instructions to identify a second instruction that is a safe point, the identifying of the second instruction based on whether the second instruction is in a list of eligible safe points, and replacing the second instruction in the series of instructions with a first instance of one or more interrupt handler instructions that initiate an interrupt handler;
   based on an identification of a second potential sequence of the series of instructions, searching the second potential sequence of the series of instructions to identify a third instruction that is a safe point, the identifying of the third instruction based on whether the third instruction is in the list of eligible safe points, and replacing the third instruction in the series of instructions with a second instance of the one or more interrupt handler instructions that initiate the interrupt handler;
   after replacing the second instruction, resuming execution of the first instruction.

2. The method of claim 1, further comprising:
   after resuming execution of the first instruction, continuing execution of the series of instructions until execution reaches the first instance of the one or more interrupt handler instructions that initiate the interrupt handler or the second instance of the one or more interrupt handler instructions;
   executing the first instance of the one or more interrupt handler instructions or the second instance of the one or more interrupt handler instructions to initiate the interrupt handler; and
   after executing the first instance of the one or more interrupt handler instructions or the second instance of the one or more interrupt handler instructions, replacing the first instance of the one or more interrupt handler instructions in the series of instructions or the second instance of the one or more interrupt handler instructions with the second instruction or the third instruction.

3. The method of claim 2, further comprising, after replacing the first instance of the one or more interrupt handler instructions or the second instance of the one or more interrupt handler instructions with the second instruction or the third instruction, continuing with execution of the series of instructions, beginning with the second instruction or the third instruction.

4. The method of claim 2, further comprising, prior to replacing the second instruction or the third instruction in the series of instructions with first instance of the one or more interrupt handler instructions that initiate the interrupt handler or the second instance of the one or more interrupt handler instructions, storing a copy of the second instruction or the third instruction and an address of the original location of the second instruction or the third instruction in a database.

5. The method of claim 4, wherein replacing the first instance of the one or more interrupt handler instructions with the second instruction includes accessing the stored copy of the second instruction and the address of the original location, and replacing the one or more interrupt handler instructions with the stored copy of the second instruction at the address of the original location.

6. The method of claim 1, further comprising, prior to searching the first potential sequence of the series of instructions to identify the second instruction that is the safe point:
   analyzing each particular instruction in the series of instructions to determine whether each particular instruction is an appropriate safe point based on the type of instruction and a context of the series of instruction where the particular instruction is executed; and
   in accordance with a determination that a particular instruction is an appropriate safe point, storing the particular instruction in a list of stored potential safe point instructions.

7. The method of claim 6, wherein searching of the first potential sequence of the series of instructions to identify the second instruction that is the safe point further comprises:
   for each particular instruction in the first potential sequence of the series of instructions;
   determining whether the particular instruction is included in the list of stored potential safe point instructions; and
   in accordance with a determination that the particular instruction is included in the list of stored potential safe point instructions, identifying the particular instruction as the second instruction that is the safe point instruction.

8. The method of claim 1, wherein the interrupt signal is transmitted to the virtual machine using an application program interface associated with an operating system of the computer system.

9. The method of claim 1, wherein the virtual machine uses an application program interface associated with an operating system of the computer system to send the interrupt signal to one of its own threads.

10. A computer system comprising:
    one or more processors; and
    a memory storing at least one executable module that, when executed by at least one of the one or more processors, causes the computer system to perform operations comprising:
    executing a series of instructions;
    while executing a first instruction in the series of instructions, receiving an interrupt signal;
    in response to receiving the interrupt signal, halting execution of the first instruction;
    after halting execution of the first instruction, searching a first potential sequence of the series of instructions to identify a second instruction that is a safe point, the identifying of the second instruction based on whether the second instruction is in a list of eligible safe points, and replacing the second instruction in the series of instructions with a first instance of one or more interrupt handler instructions that initiate an interrupt handler;
    based on an identification of a second potential sequence of the series of instructions, searching the second potential sequence of the series of instructions to identify a third instruction that is a safe point, the identifying of the third instruction based on whether the third instruction is in the list of eligible safe points, and replacing the third instruction in the series of instructions with a second instance of the one or more interrupt handler instructions that initiate the interrupt handler;
    after replacing the second instruction, resuming execution of the first instruction.

11. The computer system of claim 10, the operations further comprising:
    after resuming execution of the first instruction, continuing execution of the series of instructions until execution reaches the first instance of the one or more interrupt handler instructions that initiate the interrupt handler or the second instance of the one or more interrupt handler instructions;
    executing the first instance of the one or more interrupt handler instructions or the second instance of the one or more interrupt handler instructions to initiate the interrupt handler; and
    after executing the first instance of the one or more interrupt handler instructions or the second instance of the one or more interrupt handler instructions, replacing the first instance of the one or more interrupt handler instructions in the series of instructions or the second instance of the one or more interrupt handler instructions with the second instruction or the third instruction.

12. The computer system of claim 11, the operations further comprising, after replacing the first instance of the one or more interrupt handler instructions or the second instance of the one or more interrupt handler instructions with the second instruction or the third instruction, continuing with execution of the series of instructions, beginning with the second instruction or the third instruction.

13. The computer system of claim 10, the operations further comprising, prior to replacing the second instruction or the third instruction in the series of instructions with first instance of the one or more interrupt handler instructions that initiate the interrupt handler or the second instance of the one or more interrupt handler instructions, storing a copy of the second instruction or the third instruction and an address of the original location of the second instruction or the third instruction in a database.

14. A non-transitory computer-readable storage medium storing at least one executable module that, when executed by one or more processors of a computer system, causes the computer system to perform operations comprising:
   executing a series of instructions;
   while executing a first instruction in the series of instructions, receiving an interrupt signal;
   in response to receiving the interrupt signal, halting execution of the first instruction;
   after halting execution of the first instruction, searching a first potential sequence of the series of instructions to identify a second instruction that is a safe point, the identifying of the second instruction based on whether the second instruction is in a list of eligible safe points, and replacing the second instruction in the series of instructions with a first instance of one or more interrupt handler instructions that initiate an interrupt handler;
   based on an identification of a second potential sequence of the series of instructions, searching the second potential sequence of the series of instructions to identify a third instruction that is a safe point, the identifying of the third instruction based on whether the third instruction is in the list of eligible safe points, and replacing the third instruction in the series of instructions with a second instance of the one or more interrupt handler instructions that initiate the interrupt handler;
   after replacing the second instruction, resuming execution of the first instruction.

15. The non-transitory computer-readable storage medium of claim 14, wherein the series of instructions are being executed by a virtual machine running on the computer system.

16. The non-transitory computer-readable storage medium of claim 14, the operations further comprising:
   after resuming execution of the first instruction, continuing execution of the series of instructions until execution reaches the first instance of the one or more interrupt handler instructions that initiate the interrupt handler or the second instance of the one or more interrupt handler instructions;
   executing the first instance of the one or more interrupt handler instructions or the second instance of the one or more interrupt handler instructions to initiate the interrupt handler; and
   after executing the first instance of the one or more interrupt handler instructions or the second instance of the one or more interrupt handler instructions, replacing the first instance of the one or more interrupt handler instructions in the series of instructions or the second instance of the one or more interrupt handler instructions with the second instruction or the third instruction.

17. The non-transitory computer-readable storage medium of claim 16, the operations further comprising, after replacing the first instance of the one or more interrupt handler instructions or the second instance of the one or more interrupt handler instructions with the second instruction or the third instruction, continuing with execution of the series of instructions, beginning with the second instruction or the third instruction.

18. The non-transitory computer-readable storage medium of claim 16, the operations further comprising, prior to replacing the second instruction or the third instruction in the series of instructions with first instance of the one or more interrupt handler instructions that initiate the interrupt handler or the second instance of the one or more interrupt handler instructions, storing a copy of the second instruction or the third instruction and an address of the original location of the second instruction or the third instruction in a database.

19. The method of claim 1, wherein the list of eligible safe points includes instructions having particular types, the particular types including branch instructions, call instructions, and return instructions.

20. The method of claim 1, wherein the list of eligible safe points is generated during a pre-processing step that includes compiling the series of instructions.

* * * * *